United States Patent
Choi et al.

(10) Patent No.: US 10,298,432 B2
(45) Date of Patent: May 21, 2019

(54) APPARATUS AND METHOD FOR FILTER BANK MULTI-CARRIER SIGNAL MODULATION WITH LOW PAPR IN MULTIPLE ANTENNA SYSTEM

(71) Applicant: RESEARCH COOPERATION FOUNDATION OF YEUNGNAM UNIVERSITY, Gyeongsangbuk-do (KR)

(72) Inventors: Kwonhue Choi, Gyeongsangbuk-do (KR); Dongjun Na, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 16/100,441

(22) Filed: Aug. 10, 2018

(65) Prior Publication Data

US 2019/0052500 A1    Feb. 14, 2019

(30) Foreign Application Priority Data

Aug. 11, 2017  (KR) .................. 10-2017-0102619

(51) Int. Cl.
  *H04L 27/34*  (2006.01)
  *H04L 27/26*  (2006.01)
  *H04B 1/707*  (2011.01)

(52) U.S. Cl.
  CPC .......... *H04L 27/264* (2013.01); *H04B 1/707* (2013.01); *H04L 27/34* (2013.01);
  (Continued)

(58) Field of Classification Search
  CPC ... H04L 27/2636; H04L 27/264; H04L 27/26; H04L 2025/03426; H04L 27/362;
  (Continued)

(56) References Cited

U.S. PATENT DOCUMENTS

2017/0134204 A1* 5/2017 Yun .................... H04L 27/2615

FOREIGN PATENT DOCUMENTS

KR    10-0774290 B1    11/2007
KR    10-0995207 B1    11/2010
(Continued)

OTHER PUBLICATIONS

Notice of Allowance dated Dec. 18, 2017 from Korean Patent Office in a counterpart Korean Patent Application No. 10-2017-0102619 (all the cited references are listed in this IDS.) (English translation is also submitted herewith.).

*Primary Examiner* — Rahel Guarino
(74) *Attorney, Agent, or Firm* — The PL Law Group, PLLC

(57) ABSTRACT

An apparatus and method for filter bank multi-carrier signal modulation with a low peak-to-average power ratio (PAPR) in a multiple antenna system are disclosed. According to embodiments of the present disclosure, in a multiple antenna transmission method, after a plurality of transmission candidate signals, which are modulated for each antenna using discrete Fourier transform (DFT) spread filter bank multi-carrier and offset quadrature amplitude modulation (FBMC/OQAM) techniques and are capable of obtaining a single carrier effect, are generated, a transmission candidate signal with a low PAPR can be selected and transmitted, and thus peak-to-average power ratio performance can be effectively improved, and interference between subcarriers can be eliminated by applying an Alamouti coding manner.

16 Claims, 8 Drawing Sheets

(52) U.S. Cl.
CPC ...... *H04L 27/2614* (2013.01); *H04L 27/2636* (2013.01); *H04L 27/2698* (2013.01)

(58) Field of Classification Search
CPC ... H04L 27/3411; H04L 5/0094; H04L 27/34; H04L 5/003; H04L 1/0668; H04B 7/04; H04B 1/707
See application file for complete search history.

(56) References Cited

FOREIGN PATENT DOCUMENTS

| | | |
|---|---|---|
| KR | 10-2011-0081946 A | 7/2011 |
| KR | 10-1347480 B1 | 1/2014 |
| KR | 10-2014-0053251 A | 5/2014 |
| KR | 10-1486148 B1 | 1/2015 |
| KR | 10-1541912 B1 | 8/2015 |
| KR | 10-2017-0071093 A | 6/2017 |

\* cited by examiner

FIG. 3A

| n \ antenna | 0 | 1 | ... | N/2-2 | N/2-1 | N/2 | ... | N-3 | N-2 | N-1 |
|---|---|---|---|---|---|---|---|---|---|---|
| A | $X^{(1)}_{0,m}$ | $X^{(1)}_{1,m}$ | ... | $X^{(1)}_{N/2-2,m}$ | 0 | $(-X^{(2)}_{N/2-2,m})^*$ | ... | $(-X^{(2)}_{1,m})^*$ | $(-X^{(2)}_{0,m})^*$ | 0 |
| B | $X^{(2)}_{0,m}$ | $X^{(2)}_{1,m}$ | ... | $X^{(2)}_{N/2-2,m}$ | 0 | $(X^{(1)}_{N/2-2,m})^*$ | ... | $(X^{(1)}_{1,m})^*$ | $(X^{(1)}_{0,m})^*$ | 0 |

Frequency reversal code symbol pairs

FIG. 3B

| n \ antenna | 0 | 1 | ... | N/2-2 | N/2-1 | N/2 | ... | N-3 | N-2 | N-1 |
|---|---|---|---|---|---|---|---|---|---|---|
| A | $Y^{(1)}_{0,m}$ | $Y^{(1)}_{1,m}$ | ... | $Y^{(1)}_{N/2-2,m}$ | 0 | $(-Y^{(2)}_{N/2-2,m})^*$ | ... | $(-Y^{(2)}_{1,m})^*$ | $(-Y^{(2)}_{0,m})^*$ | 0 |
| B | $Y^{(2)}_{0,m}$ | $Y^{(2)}_{1,m}$ | ... | $Y^{(2)}_{N/2-2,m}$ | 0 | $(Y^{(1)}_{N/2-2,m})^*$ | ... | $(Y^{(1)}_{1,m})^*$ | $(Y^{(1)}_{0,m})^*$ | 0 |

Frequency reversal code symbol pairs

APPARATUS AND METHOD FOR FILTER BANK MULTI-CARRIER SIGNAL MODULATION WITH LOW PAPR IN MULTIPLE ANTENNA SYSTEM

CROSS-REFERENCE TO RELATED APPLICATION

This application claims the benefit under 35 USC § 119(a) of Korean Patent Application No. 10-2017-0102619, filed on Aug. 11, 2017, in the Korean Intellectual Property Office, the entire disclosure of which is incorporated herein by reference for all purposes.

BACKGROUND

1. Field

The present disclosure relates to a transmission and reception technique using a filter bank multi-carrier method, and more specifically, to filter bank multi-carrier and offset quadrature amplitude modulation (FBMC/OQAM) techniques using discrete Fourier transform (DFT) spreading.

2. Discussion of Related Art

A filter bank multi-carrier (FBMC) modulation technique using a plurality of subcarriers has entered the spotlight as a modulation technique for fifth-generation (5G) wireless communication. However, in the FBMC modulation technique, a high peak-to-average power ratio (PAPR) characteristic is exhibited due to overlapping of a plurality of subcarrier signals.

Particularly, in an FBMC modulation technique and an offset quadrature amplitude modulation (OQAM) technique, there is a problem in that a single carrier effect cannot be obtained due to a structural problem of OQAM even when discrete Fourier transform (DFT) spreading is applied as in a single carrier-frequency division multi access (SC-FDMA) technique.

Meanwhile, unlike an orthogonal frequency division multiplexing (OFDM) technique, it has been difficult to apply an Alamouti code to the FBMC modulation technique due to inherent inter-carrier interference (ICI) between antennas.

SUMMARY

The present disclosure is directed to providing an apparatus and method for filter bank multi-carrier signal modulation with a low peak-to-average power ratio in a multiple antenna system.

According to an aspect of the present disclosure, there is provided a modulation apparatus including a discrete Fourier transform (DFT) unit configured to generate a first DFT-spread symbol group ($D_m^{(1)}$) by performing (N/2−1)-point DFT on a first quadrature amplitude modulation (QAM) data symbol group ($d_m^{(1)}$) including N/2−1 $m^{th}$ QAM data symbols ($d_{k,m}^{(1)}$), and generate a second DFT-spread symbol group ($D_m^{(2)}$) by performing (N/2−1)-point DFT on a second QAM data symbol group ($d_m^{(2)}$) including N/2−1 $m^{th}$ QAM data symbols ($d_{k,m}^{(2)}$) (where N is the number of subcarriers, k is 0≤k≤N/2−2, m is 0≤m≤M−1, and M is a length of a data frame); an extracting unit configured to extract a real part symbol ($A_{k,m}^{(1)}$) and an imaginary part symbol ($B_{k,m}^{(1)}$) from each of DFT-spread symbols ($D_{k,m}^{(1)}$) included in the first DFT-spread symbol group ($D_m^{(1)}$), and extract a real part symbol ($A_{k,m}^{(2)}$) and an imaginary part symbol ($B_{k,m}^{(2)}$) from each of DFT-spread symbols ($D_{k,m}^{(2)}$) included in the second DFT-spread symbol group ($D_m^{(2)}$); a phase shift unit configured to generate a first real part symbol group ($X_m^{(1)}$) by multiplying real part symbols ($A_{k,m}^{(1)}$) extracted from the first DFT-spread symbol group ($D_m^{(1)}$) by a first phase shift coefficient, generate a first imaginary part symbol group ($Y_m^{(1)}$) by multiplying imaginary part symbols ($B_{k,m}^{(1)}$) extracted from the first DFT-spread symbol group ($D_m^{(1)}$) by a second phase shift coefficient, generate a second real part symbol group ($X_m^{(2)}$) by multiplying real part symbols ($A_{k,m}^{(2)}$) extracted from the second DFT-spread symbol group ($D_m^{(2)}$) by the first phase shift coefficient, and generate a second imaginary part symbol group ($Y_m^{(2)}$) by multiplying imaginary part symbols ($B_{k,m}^{(2)}$) extracted from the second DFT-spread symbol group ($D_m^{(2)}$) by the second phase shift coefficient; a sign inversion unit configured to generate a third real part symbol group ($X_m^{(2)}$) in which signs of symbols whose index k is an odd number among symbols included in the first real part symbol group ($X_m^{(1)}$) are inverted, generate a third imaginary part symbol group ($Y_m^{(3)}$) in which signs of symbols whose index k is an odd number among symbols included in the first imaginary part symbol group ($Y_m^{(1)}$) are inverted, generate a fourth real part symbol group ($X_m^{(4)}$) in which signs of symbols whose index k is an odd number among symbols included in the second real part symbol group ($X_m^{(2)}$) are inverted, and generate a fourth imaginary part symbol group ($Y_m^{(4)}$) in which signs of symbols whose index k is an odd number among symbols included in the second imaginary part symbol group ($Y_m^{(2)}$) are inverted; a switching unit configured to select and output the first real part symbol group ($X_m^{(1)}$) and the first imaginary part symbol group ($Y_m^{(1)}$) or the third real part symbol group ($X_m^{(3)}$) and the third imaginary part symbol group ($Y_m^{(3)}$), according to a first switching control bit ($S_1^{(A)}$), and select and output the second real part symbol group ($X_m^{(2)}$) and the second imaginary part symbol group ($Y_m^{(2)}$) or the fourth real part symbol group ($X_m^{(4)}$) and the fourth imaginary part symbol group ($Y_m^{(4)}$), according to a second switching control bit ($S_1^{(B)}$); an encoding unit configured to encode real part symbol groups and imaginary part symbol groups, which are output according to the first switching control bit ($S_1^{(A)}$) and the second switching control bit ($S_1^{(B)}$), to Alamouti code so as to generate real part Alamouti-coded symbol pairs and imaginary part Alamouti-coded symbol pairs for each of a first antenna and a second antenna, and map the real part Alamouti-coded symbol pairs and the imaginary part Alamouti-coded symbol pairs for each of the first antenna and the second antenna to subcarriers for each of the first antenna and the second antenna in a frequency reversal manner; a first modulation unit configured to modulate the real part Alamouti-coded symbol pairs and the imaginary part Alamouti-coded symbol pairs for the first antenna, which are mapped to the subcarriers for the first antenna in a filter bank multi-carrier and offset quadrature amplitude modulation (FBMC/OQAM) manner and generate a transmission candidate signal for the first antenna, wherein the first modulation unit generates a plurality of different transmission candidate signals according to the first switching control bit ($S_1^{(A)}$) and the second switching control bit ($S_1^{(B)}$); a second modulation unit configured to modulate the real part Alamouti-coded symbol pairs and the imaginary part Alamouti-coded symbol pairs for the second antenna, which are mapped to the subcarriers for the second antenna in a FBMC/OQAM manner, and generate a transmission candidate signal for the second antenna, wherein the second modulation unit generates a plurality of different transmission candidate signals according to the first switching control bit ($S_1^{(A)}$) and the second switching control bit ($S_1^{(B)}$); and a selection unit configured to select a transmission candidate signal set having a lowest peak power or a lowest peak-to-average power ratio from among transmission candidate sets including a transmission candidate signal for the first antenna and a transmission candidate signal for the second antenna which are generated according to the first switching control bit ($S_1^{(A)}$) and the second switching control bit ($S_1^{(B)}$) as a transmission signal for each of the first antenna and the second antenna.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 3A and 3B show diagrams showing examples of real part Alamouti-coded symbol pairs and imaginary part Alamouti-coded symbol pairs which are mapped in a frequency inversion manner;

DETAILED DESCRIPTION

Hereinafter, detailed embodiments of the present disclosure will be described with reference to the accompanying drawings. The following detailed description is provided to facilitate a comprehensive understanding of methods, apparatuses, and/or systems described in this specification. However, these are only examples, and the present disclosure is not limited thereto.

Figure 1:
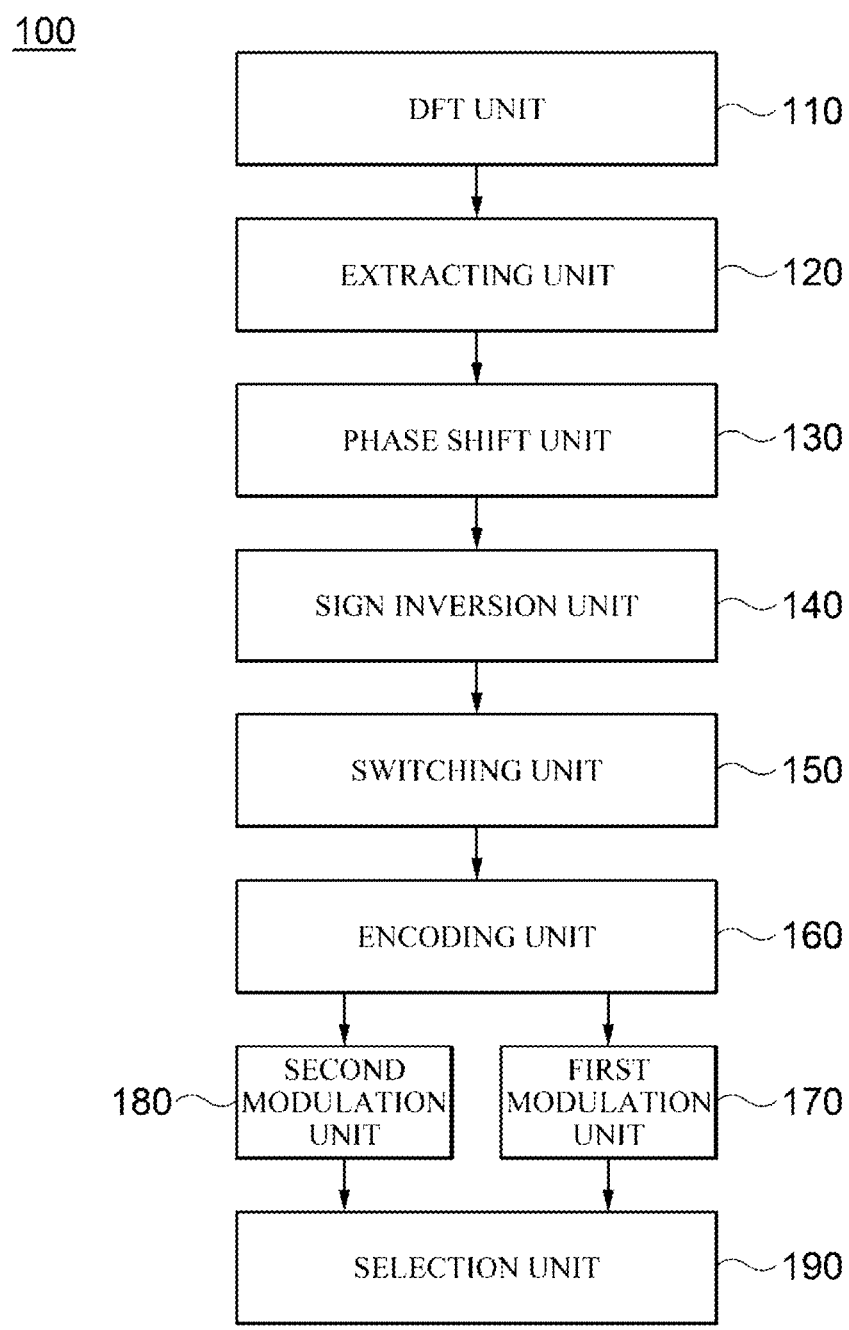
FIG. 1 is a schematic configuration diagram of a modulation apparatus according to an embodiment of the present disclosure.

FIG. 1 is a schematic configuration diagram of a modulation apparatus according to an embodiment of the present disclosure.

Referring to FIG. 1, a modulation apparatus 100 according to the embodiment of the present disclosure includes a discrete Fourier transform (DFT) unit 110, an extracting unit 120, a phase shift unit 130, a sign inversion unit 140, a switching unit 150, an encoding unit 160, a first modulation unit 170, a second modulation unit 180, and a selection unit 190.

Figure 2:
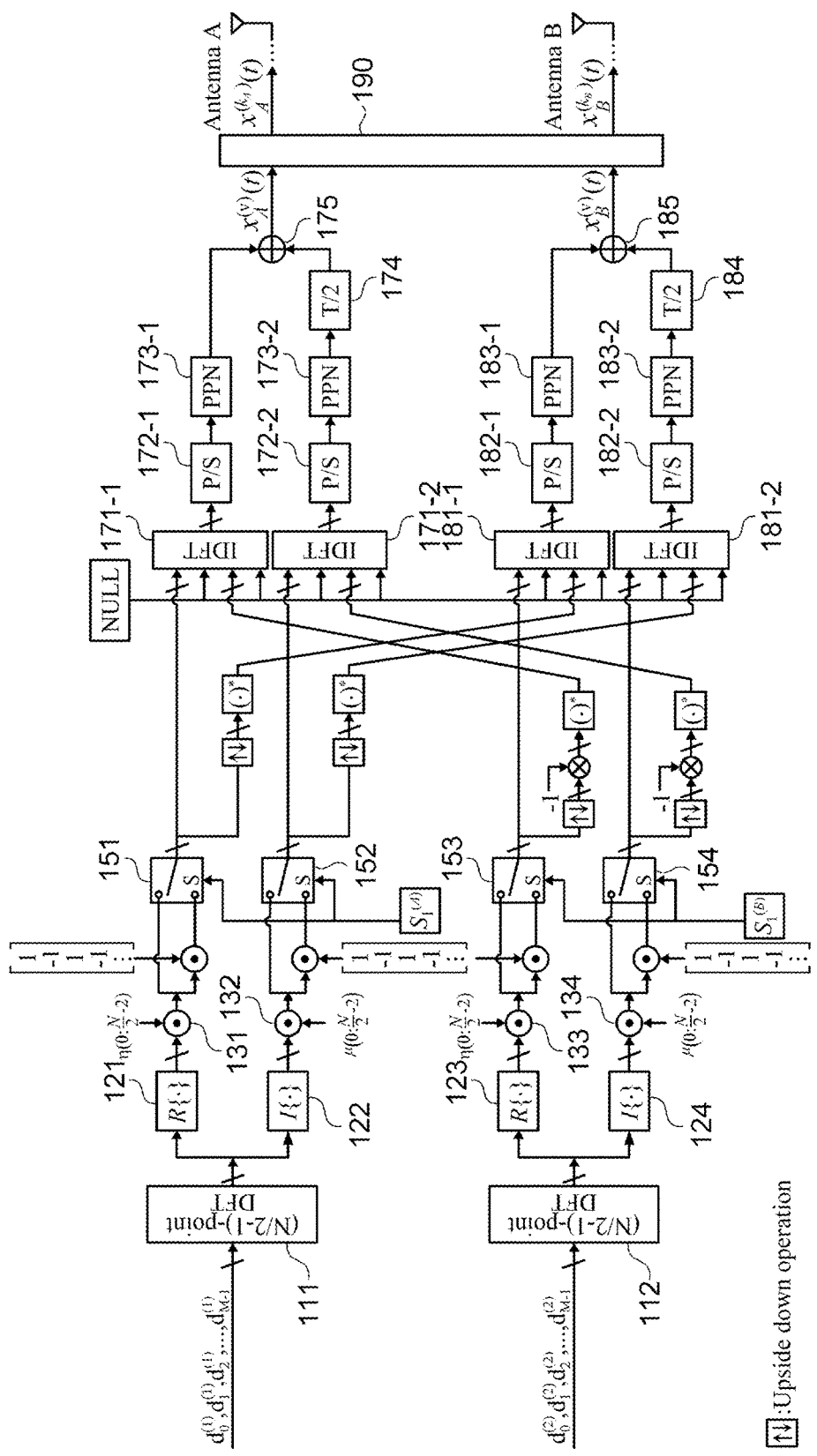
FIG. 2 is a detailed configuration diagram of a modulation apparatus according to a first embodiment of the present disclosure.

FIG. 2 is a detailed configuration diagram of a modulation apparatus according to a first embodiment of the present disclosure.

Referring to FIG. 2, a DFT unit 110 performs (N/2−1)-point DFTs 111 and 112 on two quadrature amplitude modulation (QAM) data symbol groups including N/2−1 $m^{th}$ QAM data symbols which are input in parallel.

Specifically, in the example shown in FIG. 2, a QAM data symbol $d_{k,m}^{(1)}$ which is input to an upper DFT 111 and a QAM data symbol $d_{k,m}^{(2)}$ which is input to a lower DFT 112 may be expressed by the following equations, Equations 1 and 2, respectively.

$$d_{k,m}^{(1)}=a_{k,m}^{(1)}+jb_{k,m}^{(1)}, 0\le k\le N/2-2, 0\le m\le M-1 \quad \text{[Equation 1]}$$

$$d_{k,m}^{(2)}=a_{k,m}^{(2)}+jb_{k,m}^{(2)}, 0\le k\le N/2-2, 0\le m\le M-1 \quad \text{[Equation 2]}$$

In Equations 1 and 2, $a_{k,m}^{(1)}$ denotes a real part symbol of $d_{k,m}^{(1)}$, $b_{k,m}^{(1)}$ denotes an imaginary part symbol of $d_{k,m}^{(1)}$, $a_{k,m}^{(2)}$ denotes a real part symbol of $d_{k,m}^{(2)}$, $b_{k,m}^{(2)}$ denotes an imaginary part symbol of $d_{k,m}^{(2)}$, N denotes the number of subcarriers, and M denotes a length of a data frame. These are considered to have the same meaning below.

Meanwhile, by using Equations 1 and 2, an $m^{th}$ QAM data symbol group $d_m^{(1)}$ which is input to the upper DFT 111 and an $m^{th}$ QAM data symbol group $d_m^{(2)}$ which is input to the lower DFT 112 may be expressed by the following equations, Equations 3 and 4, respectively.

$$d_m^{(1)}=[d_{0,m}^{(1)}d_{1,m}^{(1)}d_{2,m}^{(1)} \ldots d_{N/2-2,m}^{(1)}]^T \quad \text{[Equation 3]}$$

$$d_m^{(2)}=[d_{0,m}^{(2)}d_{1,m}^{(2)}d_{2,m}^{(2)} \ldots d_{N/2-2,m}^{(2)}]^T \quad \text{[Equation 4]}$$

Meanwhile, a DFT-spread symbol $D_{k,m}^{(1)}$ which is output from the upper DFT 111 and a DFT-spread symbol $D_{k,m}^{(2)}$ which is output from the lower DFT 112 may be expressed by the following equations, Equations 5 and 6, respectively.

$$D_{k,m}^{(1)}=A_{k,m}^{(1)}+jB_{k,m}^{(1)}, 0\le n\le N/2-2, 0\le m\le M-1 \quad \text{[Equation 5]}$$

$$D_{k,m}^{(2)}=A_{k,m}^{(2)}+jB_{k,m}^{(2)}, 0\le n\le N/2-2, 0\le m\le M-1 \quad \text{[Equation 6]}$$

In Equations 5 and 6, $A_{k,m}^{(1)}$ denotes a real part symbol of $D_{k,m}^{(1)}$, $B_{k,m}^{(1)}$ denotes an imaginary part symbol of $D_{k,m}^{(1)}$, $A_{k,m}^{(2)}$ denotes a real part symbol of $D_{k,m}^{(2)}$, and $B_{k,m}^{(2)}$ denotes an imaginary part symbol of $D_{k,m}^{(2)}$. These are considered to have the same meaning below.

Meanwhile, by using Equations 5 and 6, an $m^{th}$ DFT-spread symbol group $D_m^{(1)}$ which is output from the upper DFT 111 and an $m^{th}$ DFT-spread symbol group $D_m^{(2)}$ which is output from the lower DFT 112 may be expressed by the following equations, Equations 7 and 8, respectively.

$$D_m^{(1)}=[D_{0,m}^{(1)}D_{1,m}^{(1)}D_{2,m}^{(1)} \ldots D_{N/2-2,m}^{(1)}]^T \quad \text{[Equation 7]}$$

$$D_m^{(2)}=[D_{0,m}^{(2)}D_{1,m}^{(2)}D_{2,m}^{(2)} \ldots D_{N/2-2,m}^{(2)}]^T \quad \text{[Equation 8]}$$

The extracting unit 120 extracts the real part symbol $A_{k,m}^{(1)}$ and the imaginary part symbol $B_{k,m}^{(1)}$ from each of the DFT-spread symbols included in the $m^{th}$ DFT-spread symbol group $D_m^{(1)}$ which is output from the upper DFT 111 ($A_{k,m}^{(1)}$ and $B_{k,m}^{(1)}$ are 121 and 122, respectively). Further, the extracting unit 120 extracts the real part symbol $A_{k,m}^{(2)}$ and the imaginary part symbol $B_{k,m}^{(2)}$ from each of the DFT-spread symbols included in the $m^{th}$ DFT-spread symbol group $D_m^{(2)}$ which is output from the lower DFT 112 ($A_{k,m}^{(2)}$ and $B_{k,m}^{(2)}$ are 123 and 124, respectively).

The phase shift unit 130 multiplies the real part symbols $A_{k,m}^{(1)}$ and $A_{k,m}^{(2)}$ ($A_{k,m}^{(1)}$ and $A_{k,m}^{(2)}$ are 131 and 133, respectively) by a phase shift coefficient $\eta_k$ and multiplies the imaginary part symbols $B_{k,m}^{(1)}$ and $B_{k,m}^{(2)}$ by a phase shift coefficient $\mu_k$ ($B_{k,m}^{(1)}$ and $B_{k,m}^{(2)}$ are 132 and 134, respectively).

In this case, according to an embodiment of the present disclosure, the phase shift coefficients $\eta_k$ and $\mu_k$ may satisfy the following equation, Equation 9.

$$\eta_k=j^k, \mu_k=j(-j)^k \quad \text{[Equation 9]}$$

According to another embodiment of the present disclosure, the phase shift coefficients $\eta_k$ and $\mu_k$ may satisfy the following equation, Equation 10.

$$\eta_k=(-j)^k, \mu_k=(j)^{k+1} \quad \text{[Equation 10]}$$

Meanwhile, when a symbol obtained by multiplying the real part symbol $A_{k,m}^{(1)}$ by the phase shift coefficient $\eta_k$ is represented by $X_{k,m}^{(1)}$ and a symbol obtained by multiplying the imaginary part symbol $B_{k,m}^{(1)}$ by the phase shift coefficient $\mu_k$ is represented by $Y_{k,m}^{(1)}$, two symbol groups may be generated from the $m^{th}$ DFT-spread symbol group $D_m^{(1)}$ as shown in the following equations, Equations 11 and 12.

$$X_m^{(1)}=[X_{0,m}^{(1)} X_{1,m}^{(1)} X_{2,m}^{(1)} \ldots X_{N/2-2,m}^{(1)}]^T \quad \text{[Equation 11]}$$

$$Y_m^{(1)}=[Y_{0,m}^{(1)} Y_{1,m}^{(1)} Y_{2,m}^{(1)} \ldots Y_{N/2-2,m}^{(1)}]^T \quad \text{[Equation 12]}$$

Further, when a symbol obtained by multiplying the real part symbol $A_{k,m}^{(2)}$ by the phase shift coefficient $\eta_k$ is represented by $X_{k,m}^{(2)}$ and a symbol obtained by multiplying the real part symbol $B_{k,m}^{(2)}$ by the phase shift coefficient $\mu_k$ is represented by $Y_{k,m}^{(2)}$, two symbol groups may be generated from the $m^{th}$ DFT-spread symbol group $D_m^{(2)}$ as shown in the following equations, Equations 13 and 14.

$$X_m^{(2)}=[X_{0,m}^{(2)} X_{1,m}^{(2)} X_{2,m}^{(2)} \ldots X_{N/2-2,m}^{(2)}]^T \quad \text{[Equation 13]}$$

$$Y_m^{(2)}=[Y_{0,m}^{(2)} Y_{1,m}^{(2)} Y_{2,m}^{(2)} \ldots Y_{N/2-2,m}^{(2)}]^T \quad \text{[Equation 14]}$$

The sign inversion unit 140 multiplies each symbol of the symbol groups $X_m^{(1)}$, $Y_m^{(1)}$, $X_m^{(2)}$, and $Y_m^{(2)}$ by $(-1)^k$, and inverts a sign of the symbol whose index k is an odd number.

Specifically, when it is assumed that $X_{k,m}^{(3)}=(-1)^k X_{k,m}^{(1)}$, a symbol group $X_m^{(3)}$ obtained by multiplying each symbol of the symbol group $X_m^{(1)}$ by $(-1)^k$ is expressed by the following equation, Equation 15.

$$X_m^{(3)}=[X_{0,m}^{(3)} X_{1,m}^{(3)} X_{2,m}^{(3)} \ldots X_{N/2-2,m}^{(3)}]^T = [X_{0,m}^{(1)} -X_{1,m}^{(1)} X_{2,m}^{(1)} \ldots (-1)^{N/2-2} X_{N/2-2,m}^{(1)}]^T \quad \text{[Equation 15]}$$

Further, when it is assumed that $Y_{k,m}^{(3)}=(-1)^k Y_{k,m}^{(1)}$, a symbol group $Y_m^{(3)}$ obtained by multiplying each symbol of the symbol group $Y_m^{(1)}$ by $(-1)^k$ is expressed by the following equation, Equation 16.

$$Y_m^{(3)}=[Y_{0,m}^{(3)} Y_{1,m}^{(3)} Y_{2,m}^{(3)} \ldots Y_{N/2-2,m}^{(3)}]^T = [Y_{0,m}^{(1)} -Y_{1,m}^{(1)} Y_{2,m}^{(1)} \ldots (-1)^{n/2-2} Y_{N/2-2,m}^{(1)}]^T \quad \text{[Equation 16]}$$

Further, when it is assumed that $X_{k,m}^{(4)}=(-1)^k X_{k,m}^{(2)}$, a symbol group $X_m^{(4)}$ obtained by multiplying each symbol of the symbol group $X_m^{(2)}$ by $(-1)^k$ is expressed by the following equation, Equation 17.

$$X_m^{(4)}=[X_{0,m}^{(4)} X_{1,m}^{(4)} X_{2,m}^{(4)} \ldots X_{N/2-2,m}^{(4)}]^T = [X_{0,m}^{(2)} -X_{1,m}^{(2)} X_{2,m}^{(2)} \ldots (-1)^{N/2-2} X_{N/2-2,m}^{(2)}]^T \quad \text{[Equation 17]}$$

Further, when it is assumed that $Y_{k,m}^{(4)}=(-1)^k Y_{k,m}^{(2)}$, a symbol group $Y_m^{(4)}$ obtained by multiplying each symbol of the symbol group $Y_m^{(2)}$ by $(-1)^k$ is expressed by the following equation, Equation 18.

$$Y_m^{(4)}=[Y_{0,m}^{(4)} Y_{1,m}^{(4)} Y_{2,m}^{(4)} \ldots Y_{N/2-2,m}^{(4)}]^T = [Y_{0,m}^{(2)} -Y_{1,m}^{(2)} Y_{2,m}^{(2)} \ldots (-1)^{N/2-2} Y_{N/2-2,m}^{(2)}]^T \quad \text{[Equation 18]}$$

Meanwhile, the switching unit 150 selects and outputs symbol groups $X_m^{(1)}$ and $Y_m^{(1)}$ through two upper switches 151 and 152 which operate in synchronization according to a switching control bit $S_1^{(A)}$, or selects and outputs symbol groups $X_m^{(3)}$ and $Y_m^{(3)}$. That is, the symbol groups which are output through the two upper switches 151 and 152 according to the switching control bit $S_1^{(A)}$ are as follows.

| $S_1^{(A)}$ | Output Symbol Groups |
|---|---|
| 0 | $X_m^{(1)}, Y_m^{(1)}$ |
| 1 | $X_m^{(3)}, Y_m^{(3)}$ |

Further, the switching unit 150 selects and outputs symbol groups $X_m^{(2)}$ and $Y_m^{(2)}$ through two lower switches 153 and 154 which operate in synchronization according to a switching control bit $S_1^{(B)}$, or selects and outputs symbol groups $X_m^{(4)}$ and $Y_m^{(4)}$. That is, the symbol groups which are output through the two lower switches 153 and 154 according to the switching control bit $S_1^{(B)}$ are as follows.

| $S_1^{(B)}$ | Output Symbol Groups |
|---|---|
| 0 | $X_m^{(2)}, Y_m^{(2)}$ |
| 1 | $X_m^{(4)}, Y_m^{(4)}$ |

Meanwhile, the encoding unit 160 encodes the symbol groups, which are output from the switching unit 150 according to the switching control bits $S_1^{(A)}$ and $S_1^{(B)}$, to Alamouti code so as to generate real part Alamouti-coded symbol pairs and imaginary part Alamouti-coded symbol pairs for each of an antenna A and an antenna B. Next, the encoding unit 160 maps the real part Alamouti-coded symbol pairs and the imaginary part Alamouti-coded symbol pairs for each of the antenna A and the antenna B to subcarriers for each of the antenna A and the antenna B in a frequency reversal manner.

FIGS. 3A and 3B show diagrams showing examples of real part Alamouti-coded symbol pairs and imaginary part Alamouti-coded symbol pairs which are mapped in a frequency inversion manner. In the examples shown in FIGS. 3A and 3B, n denotes an index of a subcarrier. This is considered to have the same meaning below.

Specifically, FIGS. 3A and 3B show diagrams showing examples of the real part Alamouti-coded symbol pairs and the imaginary part Alamouti-coded symbol pairs when switching control bits $(S_1^{(A)}, S_1^{(B)})$ are (0,0).

Referring to FIG. 3A, the encoding unit 160 maps respective symbols of $X_m^{(1)}$ which are output from the switch 151 to $0^{th}$ to $(N/2-2)^{th}$ subcarriers of an antenna A in order with respect to an index k, and maps conjugate symbols of the respective symbols of $X_m^{(1)}$ to $(N/2)^{th}$ to $(N-2)^{th}$ subcarriers of an antenna B in reverse order with respect to the index k.

Further, the encoding unit 160 maps respective symbols of $X_m^{(2)}$ which are output from the switch 153 to $0^{th}$ to $(N/2-2)^{th}$ subcarriers of the antenna B in order with respect to an index k, and inverts signs of conjugate symbols of the respective symbols of $X_m^{(2)}$ and maps the conjugate symbols of the respective symbols of $X_m^{(2)}$ to $(N/2)^{th}$ to $(N-2)^{th}$ subcarriers of the antenna B in reverse order with respect to the index k.

Next, the encoding unit 160 maps a null value to an $(N/2-1)^{th}$ subcarrier and an $(N-1)^{th}$ subcarrier of the antennas A and B.

Further, referring to FIG. 3B, the encoding unit 160 maps respective symbols of $Y_m^{(1)}$ which are output from the switch 152 to $0^{th}$ to $(N/2-2)^{th}$ subcarriers of the antenna A in order with respect to an index k and maps conjugate symbols of the respective symbols of $Y_m^{(1)}$ to $(N/2)^{th}$ to $(N-2)^{th}$ subcarriers of the antenna B in reverse order with respect to the index k.

Further, the encoding unit 160 maps the respective symbols of $Y_m^{(2)}$ which are output from the switch 154 to $0^{th}$ to $(N/2-2)^{th}$ subcarriers of the antenna B in order with respect to the index k, and inverts signs of conjugate symbols of the respective symbols of $Y_m^{(2)}$ and maps the conjugate symbols of the respective symbols of $Y_m^{(2)}$ to $(N/2)^{th}$ to $(N-2)^{th}$ subcarriers of the antenna B in reverse order with respect to the index k.

Next, the encoding unit 160 maps a null value to the $(N/2-1)^{th}$ subcarrier and the $(N-1)^{th}$ subcarrier of the antennas A and B.

Accordingly, as in the examples shown in FIGS. 3A and 3B, it can be seen that the real part Alamouti-coded symbol pairs and the imaginary part Alamouti-coded symbol pairs, which are generated by the encoding unit 160 according to operation of the switching unit 150 are mapped to the subcarriers symmetrical based on a frequency axis with respect to the $(N/2-1)^{th}$ subcarrier.

Meanwhile, in the examples shown in FIGS. 3A and 3B, the examples in which the real part Alamouti-coded symbol pairs and the imaginary part Alamouti-coded symbol pairs are mapped to the subcarriers symmetrical based on a frequency axis with respect to the $(N/2-1)^{th}$ subcarrier according to the operation of the switching unit 150 are illustrated. However, the present disclosure is not necessarily limited thereto. Unlike the examples shown in FIGS. 3A and 3B, the real part Alamouti-coded symbol pairs and the imaginary part Alamouti-coded symbol pairs may be mapped to the subcarriers symmetrical based on a frequency axis with respect to the $(N/2)^{th}$ subcarrier.

The first modulation unit 170 modulates the real part Alamouti-coded symbol pairs and the imaginary part Alamouti-coded symbol pairs, which are mapped to the subcarriers of the antenna A by the encoding unit 160 in a frequency reversal manner according to a switching operation of the switching unit 150, in a FBMC/OQAM manner, and generates a plurality of transmission candidate signals for the antenna A.

Further, the second modulation unit 180 modulates the real part Alamouti-coded symbol pairs and the imaginary part Alamouti-coded symbol pairs, which are mapped to the subcarriers of the antenna B in a frequency reversal manner by the encoding unit 160 according to the switching operation of the switching unit 150, in a FBMC/OQAM manner, and generates a plurality of transmission candidate signals for the antenna B.

That is, as described above, since the Alamouti-coded symbol pairs which are generated by the encoding unit 160 are different according to the operation of the switching unit 150, the transmission candidate signals for the respective antennas, which are generated by the first modulation unit 170 and the second modulation unit 180, are also different according to the operation of the switching unit 150.

Specifically, in the embodiment of the present disclosure, the first modulation unit 170 performs N-point inverse DFT (IDFT) 171-1 on the real part Alamouti-coded symbol pairs which are mapped to the subcarriers of the antenna A, then performs parallel-to-serial conversion 172-1 on output vectors of the IDFT 171-1, and performs filtering using a poly-phase network (hereinafter referred to as PPN) 173-1. Further, the first modulation unit 170 performs N-point IDFT 171-2 on the imaginary part Alamouti-coded symbol pairs which are mapped to the subcarriers of the antenna A, then performs parallel-to-serial conversion 172-2 on output vectors of the IDFT 171-2, and performs filtering using a PPN 173-2. Next, the first modulation unit 170 may time-shift an output of a lower PPN 173-2 by T/2 174 and then add the time-shifted output of the lower PPN 173-2 to an output of an upper PPN 173-1 to generate a transmission candidate signal 175 for the antenna A.

Further, the second modulation unit 180 performs N-point IDFT 181-1 on the real part Alamouti-coded symbol pairs which are mapped to the subcarriers of the antenna B, then performs parallel-to-serial conversion 182-1 on output vectors of the IDFT 181-1, and performs filtering using a PPN 183-1. Further, the second modulation unit 180 performs N-point IDFT 181-2 on the imaginary part Alamouti-coded symbol pairs which are mapped to the subcarriers of the antenna B, then performs parallel-to-serial conversion 182-2 on output vectors of the IDFT 181-2, and performs filtering using a PPN 183-2. Next, the second modulation unit 180 may time-shift an output of a lower PPN 183-2 by T/2 184 and then add the time-shifted output of the lower PPN 183-2 to an output of an upper PPN 183-1 to generate a transmission candidate signal 185 for the antenna A.

Meanwhile, when it is assumed that the real part Alamouti-coded symbol pairs and the imaginary part Alamouti-coded symbol pairs, which are generated by the encoding unit 160, are respectively mapped in a frequency reversal manner on the basis of the $(N/2-1)^{th}$ subcarrier according to the operation of the switching unit 150, as in examples shown in FIGS. 3A and 3B, the case in which the switching control bits $(S_1^{(A)}, S_1^{(B)})$ are (0,0), a transmission candidate signal $x_A^{(1)}(t)$ for the antenna A, which is generated by the first modulation unit 170, and a transmission candidate signal $x_B^{(1)}(t)$ for the antenna B, which is generated by the second modulation unit 180, are respectively given by the following equations, Equations 19 and 20.

$$x_A^{(1)}(t) = \sum_{n=0}^{\frac{N}{2}-2} \sum_{m=0}^{M-1} \left\{ A_{n,m}^{(1)} h(t-mT) + jB_{n,m}^{(1)} h\left(t-mT-\frac{T}{2}\right) \right\}$$
$$e^{jn\frac{2\pi}{T}\left(t+\frac{T}{4}\right)} + \sum_{n=\frac{N}{2}}^{N-2} \sum_{m=0}^{M-1} \left\{ -(A_{(N-n-2),m}^{(2)})^* h(t-mT) - j(B_{(N-n-2),m}^{(2)})^* h\left(t-mT-\frac{T}{2}\right) \right\} e^{jn\frac{2\pi}{T}\left(t+\frac{T}{4}\right)}$$
[Equation 19]

$$x_B^{(1)}(t) = \sum_{n=0}^{\frac{N}{2}-2} \sum_{m=0}^{M-1} \left\{ A_{n,m}^{(2)} h(t-mT) + jB_{n,m}^{(2)} h\left(t-mT-\frac{T}{2}\right) \right\}$$
$$e^{jn\frac{2\pi}{T}\left(t+\frac{T}{4}\right)} + \sum_{n=\frac{N}{2}}^{N-2} \sum_{m=0}^{M-1} \left\{ (A_{(N-n-2),m}^{(1)})^* h(t-mT) - j(B_{(N-n-2),m}^{(1)})^* h\left(t-mT-\frac{T}{2}\right) \right\} e^{jn\frac{2\pi}{T}\left(t+\frac{T}{4}\right)}$$
[Equation 20]

In this case, h( ) denotes an impulse response of a prototype filter for pulse shaping, and is considered to have the same meaning below.

Further, when the switching control bits $(S_1^{(A)}, S_1^{(B)})$ are (0,1), a transmission candidate signal $x_A^{(2)}(t)$ for the antenna A, which is generated by the first modulation unit 170, and a transmission candidate signal $x_B^{(2)}(t)$ for the antenna B, which is generated by the second modulation unit 180, are respectively given by the following equations, Equations 21 and 22.

$$x_A^{(2)}(t) = \sum_{n=0}^{\frac{N}{2}-2} \sum_{m=0}^{M-1} \left\{ A_{n,m}^{(1)} h(t-mT) + jB_{n,m}^{(1)} h\left(t-mT-\frac{T}{2}\right) \right\}$$
$$e^{jn\frac{2\pi}{T}\left(t+\frac{T}{4}\right)} + \sum_{n=\frac{N}{2}}^{N-2} \sum_{m=0}^{M-1} \left\{ -(A_{(N-n-2),m}^{(2)})^* h(t-mT) - j(B_{(N-n-2),m}^{(2)})^* h\left(t-mT-\frac{T}{2}\right) \right\} e^{jn\frac{2\pi}{T}\left(t-\frac{T}{4}\right)}$$
[Equation 21]

-continued $$x_B^{(2)}(t) = \sum_{n=0}^{\frac{N}{2}-2}\sum_{m=0}^{M-1}\left\{A_{n,m}^{(2)}h(t-mT)+jB_{n,m}^{(2)}h\left(t-mT-\frac{T}{2}\right)\right\}$$ [Equation 22]

$$e^{j n \frac{2\pi}{T}\left(t+\frac{T}{4}\right)} + \sum_{n=\frac{N}{2}}^{N-2}\sum_{m=0}^{M-1}\left\{(A_{(N-n-2),m}^{(1)})^{*}h(t-mT)+\right.$$

$$\left. j(B_{(N-n-2),m}^{(1)})^{*}h\left(t-mT-\frac{T}{2}\right)\right\}e^{j n \frac{2\pi}{T}\left(t-\frac{T}{4}\right)}$$

Further, when the switching control bits $(S_1^{(A)}, S_1^{(B)})$ are (1,0), a transmission candidate signal $x_A^{(3)}(t)$ for the antenna A, which is generated by the first modulation unit 170, and a transmission candidate signal $x_B^{(3)}(t)$ for the antenna B, which is generated by the second modulation unit 180, are respectively given by the following equations, Equations 23 and 24.

$$x_A^{(3)}(t) = \sum_{n=0}^{\frac{N}{2}-2}\sum_{m=0}^{M-1}\left\{A_{n,m}^{(1)}h(t-mT)+jB_{n,m}^{(1)}h\left(t-mT-\frac{T}{2}\right)\right\}$$ [Equation 23]

$$e^{j n \frac{2\pi}{T}\left(t-\frac{T}{4}\right)} + \sum_{n=\frac{N}{2}}^{N-2}\sum_{m=0}^{M-1}\left\{-(A_{(N-n-2),m}^{(2)})^{*}h(t-mT)-\right.$$

$$\left. j(B_{(N-n-2),m}^{(2)})^{*}h\left(t-mT-\frac{T}{2}\right)\right\}e^{j n \frac{2\pi}{T}\left(t+\frac{T}{4}\right)}$$

$$x_B^{(3)}(t) = \sum_{n=0}^{\frac{N}{2}-2}\sum_{m=0}^{M-1}\left\{A_{n,m}^{(2)}h(t-mT)+jB_{n,m}^{(2)}h\left(t-mT-\frac{T}{2}\right)\right\}$$ [Equation 24]

$$e^{j n \frac{2\pi}{T}\left(t-\frac{T}{4}\right)} + \sum_{n=\frac{N}{2}}^{N-2}\sum_{m=0}^{M-1}\left\{(A_{(N-n-2),m}^{(1)})^{*}h(t-mT)+\right.$$

$$\left. j(B_{(N-n-2),m}^{(1)})^{*}h\left(t-mT-\frac{T}{2}\right)\right\}e^{j n \frac{2\pi}{T}\left(t+\frac{T}{4}\right)}$$

Further, when the switching control bits $(S_1^{(A)}, S_1^{(B)})$ are (1,1), a transmission candidate signal $x_A^{(4)}(t)$ for the antenna A, which is generated by the first modulation unit 170, and the transmission candidate signal $x_B^{(4)}(t)$ for the antenna B, which is generated by the second modulation unit 180, are respectively given by the following equations, Equations 25 and 26.

$$x_A^{(4)}(t) = \sum_{n=0}^{\frac{N}{2}-2}\sum_{m=0}^{M-1}\left\{A_{n,m}^{(1)}h(t-mT)+jB_{n,m}^{(1)}h\left(t-mT-\frac{T}{2}\right)\right\}$$ [Equation 25]

$$e^{j n \frac{2\pi}{T}\left(t-\frac{T}{4}\right)} + \sum_{n=\frac{N}{2}}^{N-2}\sum_{m=0}^{M-1}\left\{-(A_{(N-n-2),m}^{(2)})^{*}h(t-mT)-\right.$$

$$\left. j(B_{(N-n-2),m}^{(2)})^{*}h\left(t-mT-\frac{T}{2}\right)\right\}e^{j n \frac{2\pi}{T}\left(t-\frac{T}{4}\right)}$$

$$x_B^{(4)}(t) = \sum_{n=0}^{\frac{N}{2}-2}\sum_{m=0}^{M-1}\left\{A_{n,m}^{(2)}h(t-mT)+jB_{n,m}^{(2)}h\left(t-mT-\frac{T}{2}\right)\right\}$$ [Equation 26]

$$e^{j n \frac{2\pi}{T}\left(t-\frac{T}{4}\right)} + \sum_{n=\frac{N}{2}}^{N-2}\sum_{m=0}^{M-1}\left\{(A_{(N-n-2),m}^{(1)})^{*}h(t-mT)+\right.$$

$$\left. j(B_{(N-n-2),m}^{(1)})^{*}h\left(t-mT-\frac{T}{2}\right)\right\}e^{j n \frac{2\pi}{T}\left(t-\frac{T}{4}\right)}$$

Therefore, when the real part Alamouti-coded symbol pairs and the imaginary part Alamouti-coded symbol pairs, which are generated according to the switching control bits $S_1^{(A)}$ and $S_1^{(B)}$, are respectively mapped in a frequency reversal manner on the basis of the $(N/2-1)^{th}$ subcarrier as in examples shown in FIGS. 3A and 3B, transmission candidate signal sets which are generated according to the switching control bits $S_1^{(A)}$ and $S_1^{(B)}$ are as follows.

| $(s_1^{(A)}, s_1^{(B)})$ | Transmission Candidate Signal Sets $x_A^{(Y)}(t), x_B^{(Y)}(t)$ |
|---|---|
| (0, 0) | $x_A^{(1)}(t), x_B^{(1)}(t)$ |
| (0, 1) | $x_A^{(2)}(t), x_B^{(2)}(t)$ |
| (1, 0) | $x_A^{(3)}(t), x_B^{(3)}(t)$ |
| (1, 1) | $x_A^{(4)}(t), x_B^{(4)}(t)$ |

The selection unit 190 may select a transmission candidate signal set having the lowest peak power or the lowest peak-to-average power ratio (PAPR) from among four transmission candidate signal sets generated according to the operation of the switching unit 150 as a transmission signal for each antenna. Accordingly, PAPR performance can be improved.

Figure 4:
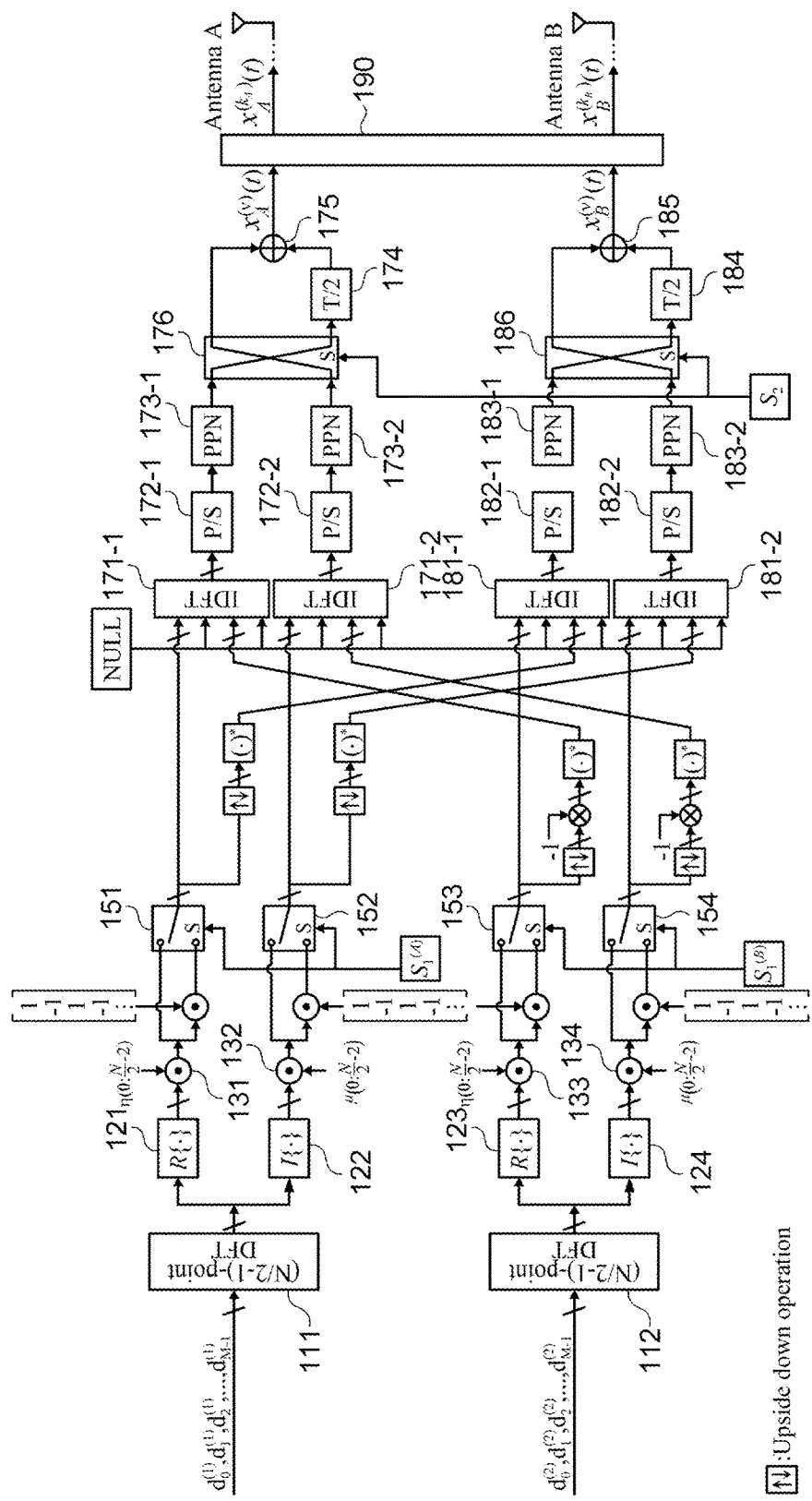
FIG. 4 is a detailed configuration diagram of a modulation apparatus according to a second embodiment of the present disclosure.

FIG. 4 is a detailed configuration diagram of a modulation apparatus according to a second embodiment of the present disclosure.

By comparing FIGS. 2 and 4, the embodiment shown in FIG. 4 has the same structure as the embodiment shown in FIG. 2 except that switches 176 and 186 for selecting an output to be time-shifted by T/2 from among outputs of the upper PPNs 173-1 and 183-1 and outputs of the lower PPNs 173-2 and 183-2 are respectively added to the first modulation unit 170 and the second modulation unit 180.

However, unlike in the embodiment shown in FIG. 2, in the embodiment shown in FIG. 4, a transmission candidate signal for each antenna may be additionally generated by a switching operation of each of the switches 176 and 186 added to the first modulation unit 170 and the second modulation unit 180.

Specifically, in the example shown in FIG. 4, the two switches 176 and 186 operate in synchronization with a switching control bit $S_2$. When the switching control bit $S_2$ is 0, the outputs of the lower PPNs 173-2 and 183-2 are time-shifted by T/2, and when the switching control bit $S_2$ is 1, the outputs of the upper PPNs 173-1 and 183-1 are time-shifted by T/2.

Therefore, in the embodiment shown in FIG. 4, different transmission candidate signals are generated according to the switching control bits $S_1^{(A)}$, $S_1^{(B)}$, and $S_2$.

Meanwhile, when the switching control bit $S_2$ is 0, the embodiment shown in FIG. 4 is the same as the embodiment shown in FIG. 2, and thus the same transmission candidate signals as those in the embodiment shown in FIG. 2 are generated according to the switching control bits $S_1^{(A)}$ and $S_1^{(B)}$, and when the switching control bit $S_2$ is 1, transmission candidate signals different from those in the embodiment shown in FIG. 2 are generated according to the switching control bits $S_1^{(A)}$ and $S_1^{(B)}$.

Specifically, when it is assumed that the real part Alamouti-coded symbol pairs and the imaginary part Alamouti-coded symbol pairs, which are generated by the encoding unit 160 according to the operation of the switching unit 150, are respectively mapped in a frequency reversal manner on the basis of the $(N/2-1)^{th}$ subcarrier as in the examples shown in FIGS. 3A and 3B, the case in which the switching control bits $(S_1^{(A)}, S_1^{(B)}, S_2)$ are (0,0,0) is the same as the case in which the switching control bits $(S_1^{(A)}, S_1^{(B)})$ are (0,0) in the example shown in FIG. 2. Therefore, when the switching control bits $(S_1^{(A)}, S_1^{(B)}, S_2)$ are (0,0,0), a transmission candidate signal $x_A^{(1)}(t)$ for the antenna A, which is generated by the first modulation unit 170, and a transmission candidate signal $x_B^{(1)}(t)$ for the antenna B, which is generated by the second modulation unit 180, are respectively given by the above-described Equations 19 and 20.

Further, when the switching control bits $(S_1^{(A)}, S_1^{(B)}, S_2)$ are (0,1,0), the embodiment shown in FIG. 4 is the same as the embodiment shown in FIG. 2 when the switching control bits $(S_0, S_1)$ are (0,1). Therefore, when the switching control bits $(S_1^{(A)}, S_1^{(B)}, S_2)$ are (0,1,0), a transmission candidate signal $x_A^{(2)}(t)$ for the antenna A, which is generated by the first modulation unit 170, and a transmission candidate signal $x_B^{(2)}(t)$ for the antenna B, which is generated by the second modulation unit 180, are respectively given by the above-described Equations 21 and 22.

Further, when the switching control bits $(S_1^{(A)}, S_1^{(B)}, S_2)$ are (1,0,0), the embodiment shown in FIG. 4 is the same as the embodiment shown in FIG. 2 when the switching control bits $(S_1^{(A)}, S_1^{(B)})$ are (1,0). Therefore, when the switching control bits $(S_1^{(A)}, S_1^{(B)}, S_2)$ are (1,0,0), a transmission candidate signal $x_A^{(3)}(t)$ for the antenna A, which is generated by the first modulation unit 170, and a transmission candidate signal $x_B^{(3)}(t)$ for the antenna B, which is generated by the second modulation unit 180, are respectively given by the above-described Equations 23 and 24.

Further, when the switching control bits $(S_1^{(A)}, S_1^{(B)}, S_2)$ are (1,1,0), the embodiment shown in FIG. 4 is the same as the embodiment shown in FIG. 2 when the switching control bits $(S_1^{(A)}, S_1^{(B)})$ are (1,1). Therefore, when the switching control bits $(S_1^{(A)}, S_1^{(B)}, S_2)$ are (1,0,0), a transmission candidate signal $x_A^{(4)}(t)$ for the antenna A, which is generated by the first modulation unit 170, and a transmission candidate signal $x_B^{(4)}(t)$ for the antenna B, which is generated by the second modulation unit 180, are respectively given by the above-described Equations 25 and 26.

Meanwhile, when the switching control bits $(S_1^{(A)}, S_1^{(B)}, S_2)$ are (0,0,1), a transmission candidate signal $x_A^{(5)}(t)$ for the antenna A, which is generated by the first modulation unit 170, and a transmission candidate signal $x_B^{(5)}(t)$ for the antenna B, which is generated by the second modulation unit 180, are respectively given by the following equations, Equations 27 and 28.

$$x_A^{(5)}(t) = \sum_{n=0}^{\frac{N}{2}-2} \sum_{m=0}^{M-1} \left\{ A_{n,m}^{(1)} h\left(t - mT - \frac{T}{2}\right) + jB_{n,m}^{(1)} h(t - mT) \right\} e^{jn\frac{2\pi}{T}\left(t+\frac{T}{4}\right)} +$$
$$\sum_{n=\frac{N}{2}}^{N-2} \sum_{m=0}^{M-1} \left\{ -(A_{(N-n-2),m}^{(2)})^* h\left(t - mT - \frac{T}{2}\right) - j(B_{(N-n-2),m}^{(2)})^* h(t - mT) \right\} e^{jn\frac{2\pi}{T}\left(t+\frac{T}{4}\right)}$$

[Equation 27]

$$x_B^{(5)}(t) = \sum_{n=0}^{\frac{N}{2}-2} \sum_{m=0}^{M-1} \left\{ A_{n,m}^{(2)} h\left(t - mT - \frac{T}{2}\right) + jB_{n,m}^{(2)} h(t - mT) \right\} e^{jn\frac{2\pi}{T}\left(t+\frac{T}{4}\right)} +$$
$$\sum_{n=\frac{N}{2}}^{N-2} \sum_{m=0}^{M-1} \left\{ (A_{(N-n-2),m}^{(1)})^* h\left(t - mT - \frac{T}{2}\right) + j(B_{(N-n-2),m}^{(1)})^* h(t - mT) \right\} e^{jn\frac{2\pi}{T}\left(t+\frac{T}{4}\right)}$$

[Equation 28]

Further, when the switching control bits $(S_1^{(A)}, S_1^{(B)}, S_2)$ are (0,1,1), a transmission candidate signal $x_A^{(6)}(t)$ for the antenna A, which is generated by the first modulation unit 170, and a transmission candidate signal $x_B^{(6)}(t)$ for the antenna B, which is generated by the second modulation unit 180, are respectively given by the following equations, Equations 29 and 30.

$$x_A^{(6)}(t) = \sum_{n=0}^{\frac{N}{2}-2} \sum_{m=0}^{M-1} \left\{ A_{n,m}^{(1)} h\left(t - mT - \frac{T}{2}\right) + jB_{n,m}^{(1)} h(t - mT) \right\} e^{jn\frac{2\pi}{T}\left(t+\frac{T}{4}\right)} +$$
$$\sum_{n=\frac{N}{2}}^{N-2} \sum_{m=0}^{M-1} \left\{ -(A_{(N-n-2),m}^{(2)})^* h\left(t - mT - \frac{T}{2}\right) - j(B_{(N-n-2),m}^{(2)})^* h(t - mT) \right\} e^{jn\frac{2\pi}{T}\left(t-\frac{T}{4}\right)}$$

[Equation 29]

$$x_B^{(6)}(t) = \sum_{n=0}^{\frac{N}{2}-2} \sum_{m=0}^{M-1} \left\{ A_{n,m}^{(2)} h(t - mT) + jB_{n,m}^{(2)} h\left(t - mT - \frac{T}{2}\right) \right\} e^{jn\frac{2\pi}{T}\left(t+\frac{T}{4}\right)} +$$
$$\sum_{n=\frac{N}{2}}^{N-2} \sum_{m=0}^{M-1} \left\{ (A_{(N-n-2),m}^{(1)})^* h\left(t - mT - \frac{T}{2}\right) + j(B_{(N-n-2),m}^{(1)})^* h(t - mT) \right\} e^{jn\frac{2\pi}{T}\left(t-\frac{T}{4}\right)}$$

[Equation 30]

Further, when the switching control bits $(S_1^{(A)}, S_1^{(B)}, S_2)$ are (1,0,1), a transmission candidate signal $x_A^{(7)}(t)$ for the antenna A, which is generated by the first modulation unit 170, and a transmission candidate signal $x_B^{(7)}(t)$ for the antenna B, which is generated by the second modulation unit 180, are respectively given by the following equations, Equations 31 and 32.

$$x_A^{(7)}(t) = \sum_{n=0}^{\frac{N}{2}-2} \sum_{m=0}^{M-1} \left\{ A_{n,m}^{(1)} h\left(t - mT - \frac{T}{2}\right) + jB_{n,m}^{(1)} h(t - mT) \right\} e^{jn\frac{2\pi}{T}\left(t-\frac{T}{4}\right)} +$$
$$\sum_{n=\frac{N}{2}}^{N-2} \sum_{m=0}^{M-1} \left\{ -(A_{(N-n-2),m}^{(2)})^* h\left(t - mT - \frac{T}{2}\right) - j(B_{(N-n-2),m}^{(2)})^* h(t - mT) \right\} e^{jn\frac{2\pi}{T}\left(t+\frac{T}{4}\right)}$$

[Equation 31]

$$x_B^{(7)}(t) = \sum_{n=0}^{\frac{N}{2}-2}\sum_{m=0}^{M-1}\left\{A_{n,m}^{(2)}h\left(t-mT-\frac{T}{2}\right)+jB_{n,m}^{(2)}h(t-mT)\right\}$$ [Equation 32]

$$e^{jn\frac{2\pi}{T}\left(t-\frac{T}{4}\right)} +$$

$$\sum_{n=\frac{N}{2}}^{N-2}\sum_{m=0}^{M-1}\left\{(A_{(N-n-2),m}^{(1)})^*h\left(t-mT-\frac{T}{2}\right)+\right.$$

$$\left.j(B_{(N-n-2),m}^{(1)})^*h(t-mT)\right\}e^{jn\frac{2\pi}{T}\left(t+\frac{T}{4}\right)}$$

Further, when the switching control bits $(S_1^{(A)}, S_1^{(B)}, S_2)$ are (1,1,1), a transmission candidate signal $x_A^{(8)}(t)$ for the antenna A, which is generated by the first modulation unit 170, and a transmission candidate signal $x_B^{(8)}(t)$ for the antenna B, which is generated by the second modulation unit 180, are respectively given by the following equations, Equations 33 and 34.

$$x_A^{(8)}(t) = \sum_{n=0}^{\frac{N}{2}-2}\sum_{m=0}^{M-1}\left\{A_{n,m}^{(1)}h\left(t-mT-\frac{T}{2}\right)+jB_{n,m}^{(1)}h(t-mT)\right\}$$ [Equation 33]

$$e^{jn\frac{2\pi}{T}\left(t-\frac{T}{4}\right)} +$$

$$\sum_{n=\frac{N}{2}}^{N-2}\sum_{m=0}^{M-1}\left\{-(A_{(N-n-2),m}^{(2)})^*h\left(t-mT-\frac{T}{2}\right)-\right.$$

$$\left.j(B_{(N-n-2),m}^{(2)})^*h(t-mT)\right\}e^{jn\frac{2\pi}{T}\left(t-\frac{T}{4}\right)}$$

$$x_B^{(8)}(t) = \sum_{n=0}^{\frac{N}{2}-2}\sum_{m=0}^{M-1}\left\{A_{n,m}^{(2)}h\left(t-mT-\frac{T}{2}\right)+jB_{n,m}^{(2)}h(t-mT)\right\}$$ [Equation 34]

$$e^{jn\frac{2\pi}{T}\left(t-\frac{T}{4}\right)} +$$

$$\sum_{n=\frac{N}{2}}^{N-2}\sum_{m=0}^{M-1}\left\{(A_{(N-n-2),m}^{(1)})^*h\left(t-mT-\frac{T}{2}\right)+\right.$$

$$\left.j(B_{(N-n-2),m}^{(1)})^*h(t-mT)\right\}e^{jn\frac{2\pi}{T}\left(t-\frac{T}{4}\right)}$$

As a result, when the real part Alamouti-coded symbol pairs and the imaginary part Alamouti-coded symbol pairs, which are generated according to the switching control bits $S_1^{(A)}$ and $S_1^{(B)}$, are respectively mapped in a frequency reversal manner on the basis of the $(N/2-1)^{th}$ subcarrier as in examples shown in FIGS. 3A and 3B, transmission candidate signal sets which are generated according to the switching control bits $S_1^{(A)}$, $S_1^{(B)}$, and $S_2$ are as follows.

| $(s_1^{(A)}, s_1^{(B)}, s_2)$ | Transmission Candidate Signal Sets $x_A^{(V)}(t), x_B^{(V)}(t)$ |
|---|---|
| (0, 0, 0) | $x_A^{(1)}(t), x_B^{(1)}(t)$ |
| (0, 1, 0) | $x_A^{(2)}(t), x_B^{(2)}(t)$ |
| (1, 0, 0) | $x_A^{(3)}(t), x_B^{(3)}(t)$ |
| (1, 1, 0) | $x_A^{(4)}(t), x_B^{(4)}(t)$ |
| (0, 0, 1) | $x_A^{(5)}(t), x_B^{(5)}(t)$ |
| (0, 1, 1) | $x_A^{(6)}(t), x_B^{(6)}(t)$ |
| (1, 0, 1) | $x_A^{(7)}(t), x_B^{(7)}(t)$ |
| (1, 1, 1) | $x_A^{(8)}(t), x_B^{(8)}(t)$ |

Meanwhile, the selection unit 190 may select a transmission candidate signal set having the lowest peak power or the lowest PAPR from among eight transmission candidate signal sets generated according to the switching control bits $S_1^{(A)}$, $S_1^{(B)}$, and $S_2$ as a transmission signal for each antenna. Accordingly, PAPR performance can be improved.

Figure 5:
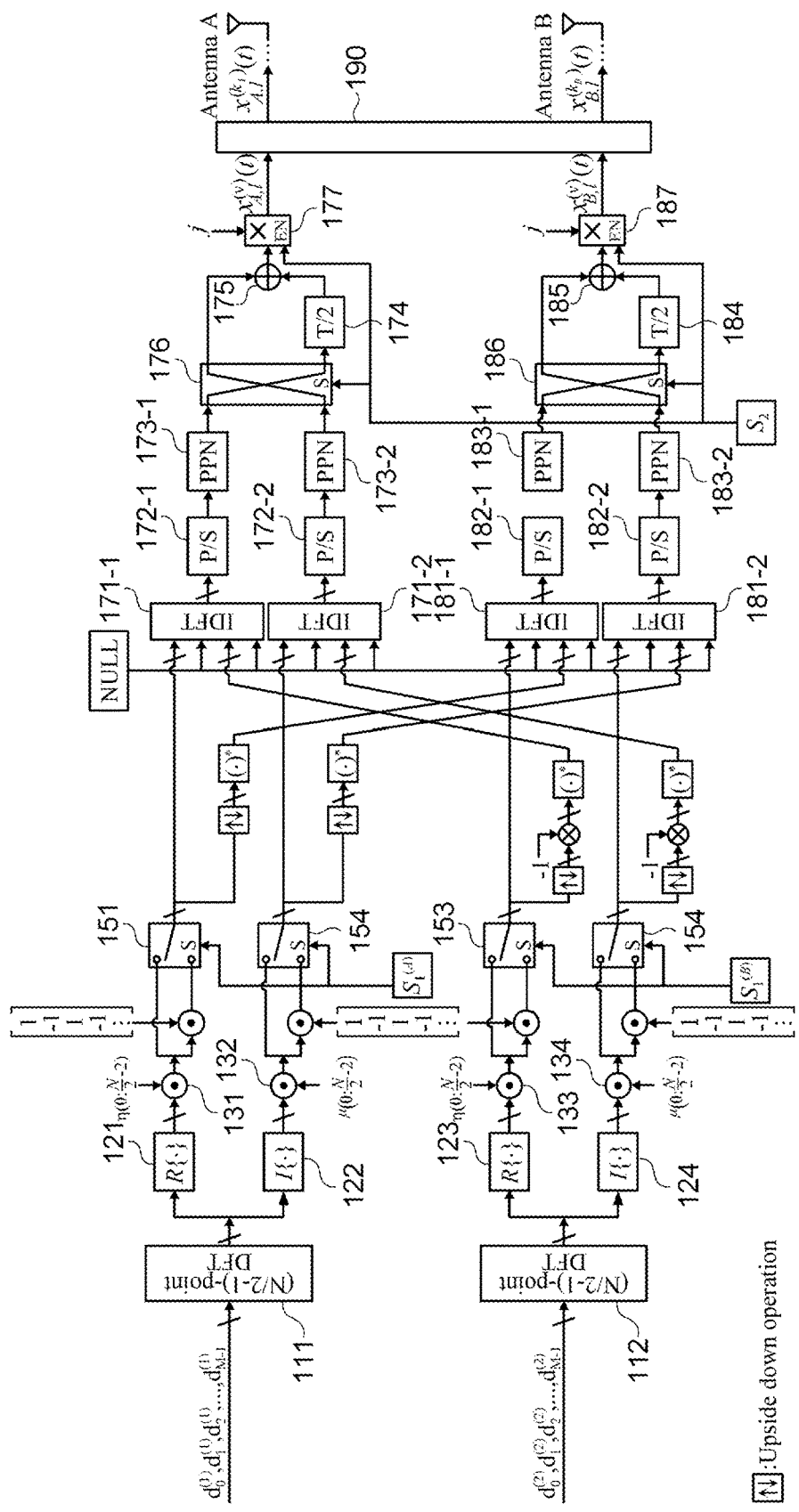
FIG. 5 is a detailed configuration diagram of a modulation apparatus according to a third embodiment of the present disclosure.

FIG. 5 is a detailed configuration diagram of a modulation apparatus according to a third embodiment of the present disclosure.

In the embodiment shown in FIG. 5, QAM data symbols of one frame, which are input to an upper DFT 111 and a lower DFT 112 of a DFT unit 110, are divided into a plurality of consecutive data blocks, and then a plurality of transmission candidate signal sets are generated for each data block to select a transmission candidate signal set having the lowest peak power or the lowest PAPR as a transmission candidate set for each data block.

Specifically in the example shown in FIG. 5, a QAM data symbol $d_{k,m}^{(1)}$ of an $l^{th}$ data block, which is input to the upper DFT 111, and a QAM data symbol $d_{k,m}^{(2)}$ of the $l^{th}$ data block, which is input to the lower DFT 112, may be respectively expressed by the following equations, Equations 35 and 36.

$$d_{k,m}^{(1)}=a_{k,m}^{(1)}+jb_{k,m}^{(1)}, 0\leq n\leq N/2-2, lW\leq m\leq (l+1)W-1$$ [Equation 35]

$$d_{k,m}^{(2)}=a_{k,m}^{(2)}+jb_{k,m}^{(2)}, 0\leq n\leq N/2-2, lW\leq m\leq (l+1)W-1$$ [Equation 36]

In this case, W denotes a length of the divided data block, L denotes the number of divided data blocks, and l denotes an index of the divided data block, which is a real number satisfying $0\leq l\leq L-1$.

Meanwhile, by comparing FIGS. 4 and 5, it can be seen that the embodiment shown in FIG. 5 has the same structure as the embodiment shown in FIG. 4 except that the transmission candidate signals are generated for each antenna according to switching control bits $S_1^{(A)}$, $S_1^{(B)}$, and $S_2$, and then the generated transmission candidate signals are multiplied by an imaginary number j when the switching control bit $S_2$ is 1 (the multiplied results are 177 and 187).

Therefore, when it is assumed that the real part Alamouti-coded symbol pairs and the imaginary part Alamouti-coded symbol pairs, which are generated by the encoding unit 160 according to the operation of the switching unit 150, are respectively mapped in a frequency reversal manner on the basis of the $(N/2-1)^{th}$ subcarrier as in the examples shown in FIGS. 3A and 3B, in the case in which the switching control bits $(S_1^{(A)},S_1^{(B)},S_2)$ are (0,0,0), a transmission candidate signal $x_{A,l}^{(1)}(t)$ for the antenna A, which is generated by the first modulation unit 170, and a transmission candidate signal $x_{B,l}^{(1)}(t)$ for the antenna B, which is generated by the second modulation unit 180, are respectively given by the following equations, Equations 37 and 38.

$$x_{A,l}^{(1)}(t) = \sum_{n=0}^{\frac{N}{2}-2}\sum_{m=lw}^{(l+1)W-1}\left\{A_{n,m}^{(1)}h(t-mT)+jB_{n,m}^{(1)}h\left(t-mT-\frac{T}{2}\right)\right\}$$ [Equation 37]

$$e^{jn\frac{2\pi}{T}\left(t+\frac{T}{4}\right)} +$$

$$\sum_{n=\frac{N}{2}}^{N-2}\sum_{m=lw}^{(l+1)W-1}\left\{-(A_{(N-n-2),m}^{(2)})^*h(t-mT)-\right.$$

$$\left.j(B_{(N-n-2),m}^{(2)})^*h\left(t-mT-\frac{T}{2}\right)\right\}e^{jn\frac{2\pi}{T}\left(t+\frac{T}{4}\right)}$$

$$x_{B,l}^{(1)}(t) = \sum_{n=0}^{\frac{N}{2}-2} \sum_{m=lw}^{(l+1)W-1} \left\{ A_{n,m}^{(2)} h(t-mT) + jB_{n,m}^{(2)} h\left(t-mT-\frac{T}{2}\right) \right\}$$

$$e^{jn\frac{2\pi}{T}\left(t+\frac{T}{4}\right)} + \sum_{n=\frac{N}{2}}^{N-2} \sum_{m=lw}^{(l+1)W-1} \left\{ \left(A_{(N-n-2),m}^{(1)}\right)^* h(t-mT) + j\left(B_{(N-n-2),m}^{(1)}\right)^* h\left(t-mT-\frac{T}{2}\right) \right\} e^{jn\frac{2\pi}{T}\left(t+\frac{T}{4}\right)}$$

[Equation 38]

Further, when the switching control bits $(S_1^{(A)}, S_1^{(B)}, S_2)$ are (0,1,0), a transmission candidate signal $x_{A,l}^{(2)}(t)$ for the antenna A, which is generated by the first modulation unit 170 and a transmission candidate signal $x_{B,l}^{(2)}(t)$ for the antenna B, which is generated by the second modulation unit 180, are respectively given by the following equations, Equations 39 and 40.

$$x_{A,l}^{(2)}(t) = \sum_{n=0}^{\frac{N}{2}-2} \sum_{m=lw}^{(l+1)W-1} \left\{ A_{n,m}^{(1)} h(t-mT) + jB_{n,m}^{(1)} h\left(t-mT-\frac{T}{2}\right) \right\}$$

$$e^{jn\frac{2\pi}{T}\left(t+\frac{T}{4}\right)} +$$

$$\sum_{n=\frac{N}{2}}^{N-2} \sum_{m=lw}^{(l+1)W-1} \left\{ -\left(A_{(N-n-2),m}^{(2)}\right)^* h(t-mT) - j\left(B_{(N-n-2),m}^{(2)}\right)^* h\left(t-mT-\frac{T}{2}\right) \right\} e^{jn\frac{2\pi}{T}\left(t-\frac{T}{4}\right)}$$

[Equation 39]

$$x_{B,l}^{(2)}(t) = \sum_{n=0}^{\frac{N}{2}-2} \sum_{m=lw}^{(l+1)W-1} \left\{ A_{n,m}^{(2)} h(t-mT) + jB_{n,m}^{(2)} h\left(t-mT-\frac{T}{2}\right) \right\}$$

$$e^{jn\frac{2\pi}{T}\left(t+\frac{T}{4}\right)} + \sum_{n=\frac{N}{2}}^{N-2} \sum_{m=lw}^{(l+1)W-1} \left\{ \left(A_{(N-n-2),m}^{(1)}\right)^* h(t-mT) + j\left(B_{(N-n-2),m}^{(1)}\right)^* h\left(t-mT-\frac{T}{2}\right) \right\} e^{jn\frac{2\pi}{T}\left(t-\frac{T}{4}\right)}$$

[Equation 40]

Further, when the switching control bits $(S_1^{(A)}, S_1^{(B)}, S_2)$ are (1,0,0), a transmission candidate signal $x_{A,l}^{(3)}(t)$ for the antenna A, which is generated by the first modulation unit 170, and a transmission candidate signal $x_{B,l}^{(3)}(t)$ for the antenna B, which is generated by the second modulation unit 180 are respectively given by the following equations, Equations 41 and 42.

$$x_{A,l}^{(3)}(t) = \sum_{n=0}^{\frac{N}{2}-2} \sum_{m=lw}^{(l+1)W-1} \left\{ A_{n,m}^{(1)} h(t-mT) + jB_{n,m}^{(1)} h\left(t-mT-\frac{T}{2}\right) \right\}$$

$$e^{jn\frac{2\pi}{T}\left(t-\frac{T}{4}\right)} +$$

$$\sum_{n=\frac{N}{2}}^{N-2} \sum_{m=lw}^{(l+1)W-1} \left\{ -\left(A_{(N-n-2),m}^{(2)}\right)^* h(t-mT) - j\left(B_{(N-n-2),m}^{(2)}\right)^* h\left(t-mT-\frac{T}{2}\right) \right\} e^{jn\frac{2\pi}{T}\left(t+\frac{T}{4}\right)}$$

[Equation 41]

$$x_{B,l}^{(3)}(t) = \sum_{n=0}^{\frac{N}{2}-2} \sum_{m=lw}^{(l+1)W-1} \left\{ A_{n,m}^{(2)} h(t-mT) + jB_{n,m}^{(2)} h\left(t-mT-\frac{T}{2}\right) \right\}$$

$$e^{jn\frac{2\pi}{T}\left(t-\frac{T}{4}\right)} + \sum_{n=\frac{N}{2}}^{N-2} \sum_{m=lw}^{(l+1)W-1} \left\{ \left(A_{(N-n-2),m}^{(1)}\right)^* h(t-mT) + j\left(B_{(N-n-2),m}^{(1)}\right)^* h\left(t-mT-\frac{T}{2}\right) \right\} e^{jn\frac{2\pi}{T}\left(t+\frac{T}{4}\right)}$$

[Equation 42]

Further, when the switching control bits $(S_1^{(A)}, S_1^{(B)}, S_2)$ are (1,1,0), a transmission candidate signal $x_{A,l}^{(4)}(t)$ for the antenna A, which is generated by the first modulation unit 170, and a transmission candidate signal $A_{B,l}^{(4)}(t)$ for the antenna B, which is generated by the second modulation unit 180, are respectively given by the following equations, Equations 43 and 44.

$$x_{A,l}^{(4)}(t) = \sum_{n=0}^{\frac{N}{2}-2} \sum_{m=lw}^{(l+1)W-1} \left\{ A_{n,m}^{(1)} h(t-mT) + jB_{n,m}^{(1)} h\left(t-mT-\frac{T}{2}\right) \right\}$$

$$e^{jn\frac{2\pi}{T}\left(t-\frac{T}{4}\right)} +$$

$$\sum_{n=\frac{N}{2}}^{N-2} \sum_{m=lw}^{(l+1)W-1} \left\{ -\left(A_{(N-n-2),m}^{(2)}\right)^* h(t-mT) - j\left(B_{(N-n-2),m}^{(2)}\right)^* h\left(t-mT-\frac{T}{2}\right) \right\} e^{jn\frac{2\pi}{T}\left(t-\frac{T}{4}\right)}$$

[Equation 43]

$$x_{B,l}^{(4)}(t) = \sum_{n=0}^{\frac{N}{2}-2} \sum_{m=lw}^{(l+1)W-1} \left\{ A_{n,m}^{(2)} h(t-mT) + jB_{n,m}^{(2)} h\left(t-mT-\frac{T}{2}\right) \right\}$$

$$e^{jn\frac{2\pi}{T}\left(t-\frac{T}{4}\right)} + \sum_{n=\frac{N}{2}}^{N-2} \sum_{m=lw}^{(l+1)W-1} \left\{ \left(A_{(N-n-2),m}^{(1)}\right)^* h(t-mT) + j\left(B_{(N-n-2),m}^{(1)}\right)^* h\left(t-mT-\frac{T}{2}\right) \right\} e^{jn\frac{2\pi}{T}\left(t-\frac{T}{4}\right)}$$

[Equation 44]

Meanwhile, when the switching control bits $(S_1^{(A)}, S_1^{(B)}, S_2)$ are (0,0,1), a transmission candidate signal $x_{A,l}^{(5)}(t)$ for the antenna A, which is generated by the first modulation unit 170, and a transmission candidate signal $x_{B,l}^{(5)}(t)$ for the antenna B, which is generated by the second modulation unit 180, are respectively given by the following equations, Equations 45 and 46.

$$x_{A,l}^{(5)}(t) = \sum_{n=0}^{\frac{N}{2}-2} \sum_{m=lw}^{(l+1)W-1} \left\{ jA_{n,m}^{(1)} h\left(t-mT-\frac{T}{2}\right) - B_{n,m}^{(1)} h(t-mT) \right\}$$

$$e^{jn\frac{2\pi}{T}\left(t+\frac{T}{4}\right)} +$$

$$\sum_{n=\frac{N}{2}}^{N-2} \sum_{m=lw}^{(l+1)W-1} \left\{ -j\left(A_{(N-n-2),m}^{(2)}\right)^* h\left(t-mT-\frac{T}{2}\right) + \left(B_{(N-n-2),m}^{(2)}\right)^* h\left(t-mT-\frac{T}{2}\right) \right\} e^{jn\frac{2\pi}{T}\left(t+\frac{T}{4}\right)}$$

[Equation 45]

$$x_{B,l}^{(5)}(t) = \sum_{n=0}^{\frac{N}{2}-2} \sum_{m=lw}^{(l+1)W-1} \left\{ jA_{n,m}^{(2)} h\left(t - mT - \frac{T}{2}\right) - B_{n,m}^{(2)} h(t - mT) \right\}$$ [Equation 46]

$$e^{jn\frac{2\pi}{T}\left(t+\frac{T}{4}\right)} + \sum_{n=\frac{N}{2}}^{N-2} \sum_{m=lw}^{(l+1)W-1} \left\{ j(A_{(N-n-2),m}^{(1)})^* h(t - mT) - (B_{(N-n-2),m}^{(1)})^* h(t - mT) \right\} e^{jn\frac{2\pi}{T}\left(t+\frac{T}{4}\right)}$$

Further, when the switching control bits $(S_1^{(A)}, S_1^{(B)}, S_2)$ are (0,1,1), a transmission candidate signal $x_{A,l}^{(6)}(t)$ for the antenna A, which is generated by the first modulation unit 170, and a transmission candidate signal $A_{B,l}^{(6)}(t)$ for the antenna B, which is generated by the second modulation unit 180, are respectively given by the following equations, Equations 47 and 48.

$$x_{A,l}^{(6)}(t) = \sum_{n=0}^{\frac{N}{2}-2} \sum_{m=lw}^{(l+1)W-1} \left\{ jA_{n,m}^{(1)} h\left(t - mT - \frac{T}{2}\right) - B_{n,m}^{(1)} h(t - mT) \right\}$$ [Equation 47]

$$e^{jn\frac{2\pi}{T}\left(t+\frac{T}{4}\right)} + \sum_{n=\frac{N}{2}}^{N-2} \sum_{m=lw}^{(l+1)W-1} \left\{ -j(A_{(N-n-2),m}^{(2)})^* h\left(t - mT - \frac{T}{2}\right) + (B_{(N-n-2),m}^{(2)})^* h\left(t - mT - \frac{T}{2}\right) \right\} e^{jn\frac{2\pi}{T}\left(t-\frac{T}{4}\right)}$$

$$x_{B,l}^{(6)}(t) = \sum_{n=0}^{\frac{N}{2}-2} \sum_{m=lw}^{(l+1)W-1} \left\{ jA_{n,m}^{(2)} h(t - mT) - B_{n,m}^{(2)} h\left(t - mT - \frac{T}{2}\right) \right\}$$ [Equation 48]

$$e^{jn\frac{2\pi}{T}\left(t+\frac{T}{4}\right)} + \sum_{n=\frac{N}{2}}^{N-2} \sum_{m=lw}^{(l+1)W-1} \left\{ j(A_{(N-n-2),m}^{(1)})^* h\left(t - mT - \frac{T}{2}\right) - (B_{(N-n-2),m}^{(1)})^* h(t - mT) \right\} e^{jn\frac{2\pi}{T}\left(t-\frac{T}{4}\right)}$$

Further, when the switching control bits $(S_1^{(A)}, S_1^{(B)}, S_2)$ are (1,0,1), a transmission candidate signal $x_{A,l}^{(7)}(t)$ a for the antenna A, which is generated by the first modulation unit 170, and a transmission candidate signal $x_B^{(7)}(t)$ for the antenna B, which is generated by the second modulation unit 180, are respectively given by the following equations, Equations 49 and 50.

$$x_{A,l}^{(7)}(t) = \sum_{n=0}^{\frac{N}{2}-2} \sum_{m=lw}^{(l+1)W-1} \left\{ jA_{n,m}^{(1)} h\left(t - mT - \frac{T}{2}\right) - B_{n,m}^{(1)} h(t - mT) \right\}$$ [Equation 49]

$$e^{jn\frac{2\pi}{T}\left(t-\frac{T}{4}\right)} + \sum_{n=\frac{N}{2}}^{N-2} \sum_{m=lw}^{(l+1)W-1} \left\{ -j(A_{(N-n-2),m}^{(2)})^* h\left(t - mT - \frac{T}{2}\right) + (B_{(N-n-2),m}^{(2)})^* h(t - mT) \right\} e^{jn\frac{2\pi}{T}\left(t+\frac{T}{4}\right)}$$

$$x_{B,l}^{(7)}(t) = \sum_{n=0}^{\frac{N}{2}-2} \sum_{m=lw}^{(l+1)W-1} \left\{ jA_{n,m}^{(2)} h\left(t - mT - \frac{T}{2}\right) - B_{n,m}^{(2)} h(t - mT) \right\}$$ [Equation 50]

$$e^{jn\frac{2\pi}{T}\left(t-\frac{T}{4}\right)} + \sum_{n=\frac{N}{2}}^{N-2} \sum_{m=lw}^{(l+1)W-1} \left\{ j(A_{(N-n-2),m}^{(1)})^* h\left(t - mT - \frac{T}{2}\right) - (B_{(N-n-2),m}^{(1)})^* h(t - mT) \right\} e^{jn\frac{2\pi}{T}\left(t+\frac{T}{4}\right)}$$

Further, when the switching control bits $(S_1^{(A)}, S_1^{(B)}, S_2)$ are (1,1,1), a transmission candidate signal $x_{A,l}^{(8)}(t)$ for the antenna A, which is generated by the first modulation unit 170, and a transmission candidate signal $x_{B,l}^{(8)}(t)$ for the antenna B, which is generated by the second modulation unit 180, are respectively given by the following equations, Equations 51 and 52.

$$x_{A,l}^{(8)}(t) =$$ [Equation 51]

$$\sum_{n=0}^{\frac{N}{2}-2} \sum_{m=lw}^{(l+1)W-1} \left\{ jA_{n,m}^{(1)} h\left(t - mT - \frac{T}{2}\right) - jB_{n,m}^{(1)} h(t - mT) \right\}$$

$$e^{jn\frac{2\pi}{T}\left(t-\frac{T}{4}\right)} + \sum_{n=\frac{N}{2}}^{N-2} \sum_{m=lw}^{(l+1)W-1} \left\{ -j(A_{(N-n-2),m}^{(2)})^* h\left(t - mT - \frac{T}{2}\right) + (B_{(N-n-2),m}^{(2)})^* h(t - mT) \right\} e^{jn\frac{2\pi}{T}\left(t-\frac{T}{4}\right)}$$

$$x_{B,l}^{(8)}(t) = \sum_{n=0}^{\frac{N}{2}-2} \sum_{m=lw}^{(l+1)W-1} \left\{ jA_{n,m}^{(2)} h\left(t - mT - \frac{T}{2}\right) - B_{n,m}^{(2)} h(t - mT) \right\}$$ [Equation 52]

$$e^{jn\frac{2\pi}{T}\left(t-\frac{T}{4}\right)} + \sum_{n=\frac{N}{2}}^{N-2} \sum_{m=lw}^{(l+1)W-1} \left\{ j(A_{(N-n-2),m}^{(1)})^* h\left(t - mT - \frac{T}{2}\right) - (B_{(N-n-2),m}^{(1)})^* h(t - mT) \right\} e^{jn\frac{2\pi}{T}\left(t-\frac{T}{4}\right)}$$

As a result, when the real part Alamouti-coded symbol pairs and the imaginary part Alamouti-coded symbol pairs, which are generated according to the switching control bits $S_1^{(A)}$ and $S_1^{(B)}$, are respectively mapped in a frequency reversal manner on the basis of the $(N/2-1)^{th}$ subcarrier as in examples shown in FIGS. 3A and 3B, transmission candidate signal sets for the $l^{th}$ data block, which are generated according to the switching control bits $S_1^{(A)}$, $S_1^{(B)}$, and $S_2$, are as follows.

| $(s_1^{(A)}, s_1^{(B)}, s_2)$ | Transmission Candidate Signal Sets $x_{A,l}^{(V)}(t), x_{B,l}^{(V)}(t)$ |
| --- | --- |
| (0, 0, 0) | $x_{A,l}^{(1)}(t), x_{B,l}^{(1)}(t)$ |
| (1, 0, 0) | $x_{A,l}^{(2)}(t), x_{B,l}^{(2)}(t)$ |
| (0, 1, 0) | $x_{A,l}^{(3)}(t), x_{B,l}^{(3)}(t)$ |
| (1, 1, 0) | $x_{A,l}^{(4)}(t), x_{B,l}^{(4)}(t)$ |
| (0, 0, 1) | $x_{A,l}^{(5)}(t), x_{B,l}^{(5)}(t)$ |
| (1, 0, 1) | $x_{A,l}^{(6)}(t), x_{B,l}^{(6)}(t)$ |
| (0, 1, 1) | $x_{A,l}^{(7)}(t), x_{B,l}^{(7)}(t)$ |
| (1, 1, 1) | $x_{A,l}^{(8)}(t), x_{B,l}^{(8)}(t)$ |

Meanwhile, the selection unit 190 may select a transmission candidate signal set having the lowest peak power or the lowest PAPR from among eight transmission candidate signal sets generated according to the switching control bits $S_1^{(A)}$, $S_1^{(B)}$, and $S_2$ as a transmission signal for the $l^{th}$ data block.

Further, the selection unit 190 may generate a transmission signal for all the data frames by sequentially connecting the transmission signal sets selected for each data block.

Figure 6:
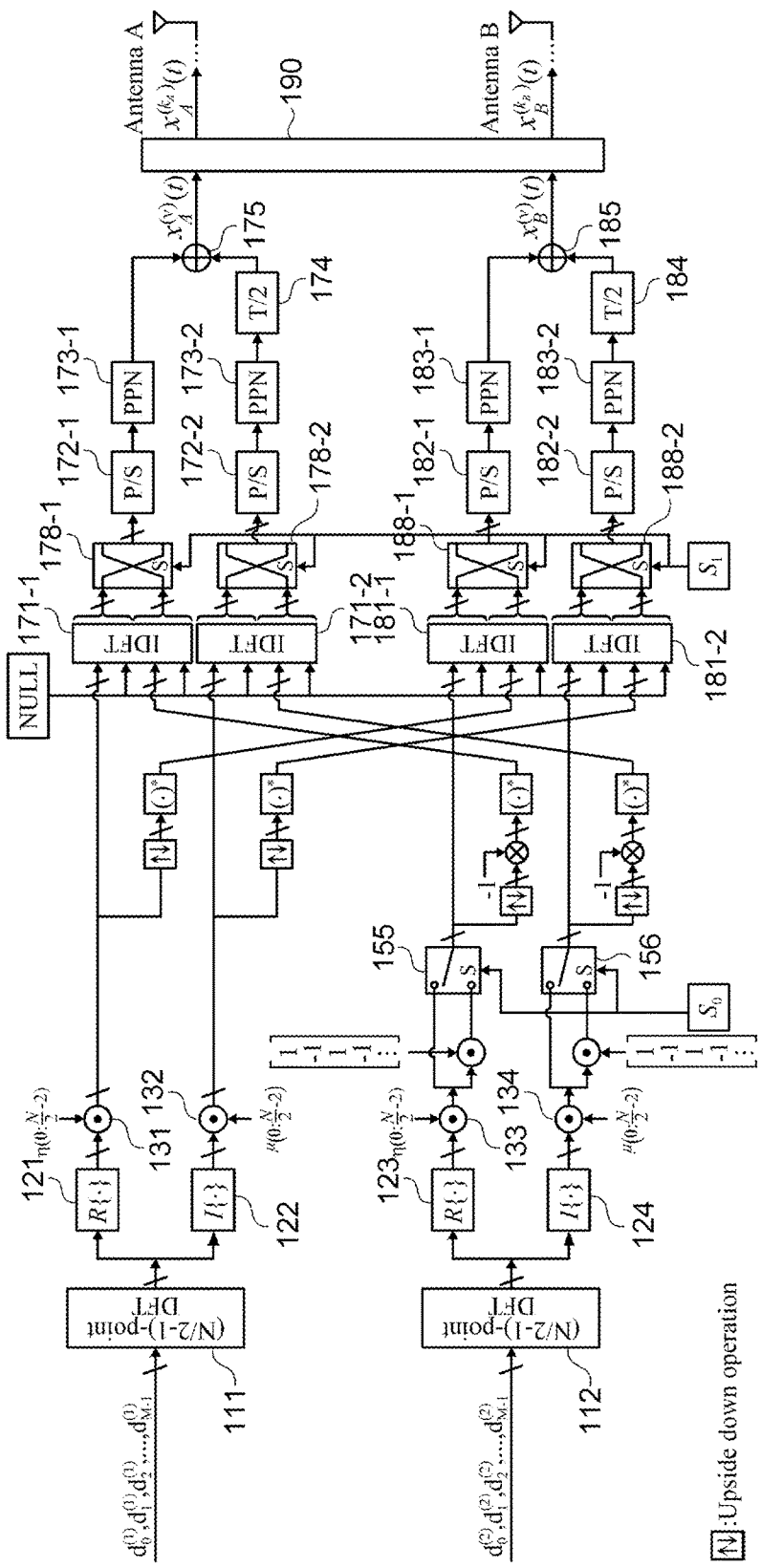
FIG. 6 is a detailed configuration diagram of a modulation apparatus according to a fourth embodiment of the present disclosure.

FIG. 6 is a detailed configuration diagram of a modulation apparatus according to a fourth embodiment of the present disclosure.

Since a DFT unit 110, an extracting unit 120, a phase shift unit 130, and a selection unit 190 in FIG. 6 are respectively the same as the DFT unit 110, the extracting unit 120, the phase shift unit 130, and the selection unit 190 shown in FIG. 2, detailed descriptions thereof will be omitted.

Referring to FIG. 6, a sign inversion unit 140 generates a symbol group $X_m^{(4)}$ by multiplying each symbol included in a symbol group $X_m^{(2)}$ by $(-1)^k$, and generates a symbol group $Y_m^{(4)}$ by multiplying each symbol included in a symbol group $Y_m^{(2)}$ by $(-1)^k$.

Meanwhile, the switching unit 150 selects and outputs the symbol groups $X_m^{(2)}$ and $Y_m^{(2)}$ or $X_m^{(4)}$ and $Y_m^{(4)}$, through two switches 155 and 156 which operate in synchronization with a switching control bit $S_0$. That is, the symbol groups which are output through the two switches 155 and 156 according to the switching control bit $S_0$ are as follows.

| $s_0$ | Output Symbol Groups |
| --- | --- |
| 0 | $X_m^{(2)}, Y_m^{(2)}$ |
| 1 | $X_m^{(4)}, Y_m^{(4)}$ |

Meanwhile, the encoding unit 160 encodes the symbol group $X_m^{(1)}$ and the symbol group, which is output from the switch 155 according to the switching control bit $S_0$, to Alamouti's code so as to generate real part Alamouti-coded symbol pairs for each of an antenna A and an antenna B. Further, the encoding unit 160 encodes the symbol group $X_m^{(1)}$ and the symbol group, which is output from the switch 156 according to the switching control bit, $S_0$ to Alamouti's code so as to generate imaginary part Alamouti-coded symbol pairs for each of the antenna A and the antenna B. Next, the encoding unit 160 maps the real part Alamouti-coded symbol pairs and the imaginary part Alamouti-coded symbol pairs for each of the antenna A and the antenna B to subcarriers for each of the antenna A and the antenna B in a frequency reversal manner.

Meanwhile, in the example shown in FIG. 6, the first modulation unit 170 and the second modulation unit 180 each generate a transmission candidate signal by substantially the same process as the first modulation unit 170 and the second modulation unit 180 shown in FIG. 2. However, the first modulation unit 170 and the second modulation unit 180 in the example shown in FIG. 6 differ from the first modulation unit 170 and the second modulation unit 180 shown in FIG. 2 in that switches 178-1, 178-2, 188-1, and 188-2 for performing switching on outputs of the IDFTs 171-1, 171-2, 181-1, and 181-2 are respectively included.

Specifically, the switches 178-1, 178-2, 188-1, and 188-2, which are respectively included in the first modulation unit 170 and the second modulation unit 180, operate in synchronization with a switching control bit $S_1$. Further, when the switching control bit $S_0$ is 0, each of the switches 178-1, 178-2, 188-1, and 188-2 outputs an output vector itself of the IDFT without switching, and when the switching control bit $S_0$ is 1, each of the switches 178-1, 178-2, 188-1, and 188-2 switches and outputs $0^{th}$ to $(N/2-1)^{th}$ outputs with $(N/2)^{th}$ to $(N-1)^{th}$ outputs among the output vector of the IDFT.

For example, when it is assumed that an output vector which is output from the switch 178-1 is $U_m^{(S_1=0)}$ in the case in which the switching control bit $S_0$ is 0, an output vector $U_m^{(S_1=1)}$ which is output from the switch 178-1 in the case in which the switching control bit $S_0$ is 1 may be expressed by the following equation, Equation 53.

$$U_m^{(S_1=1)}=[U_m^{(S_1=0)}(N/2:N-1) U_m^{(S_1=0)}(0:N/2-1)] \quad \text{[Equation 53]}$$

Meanwhile, the first modulation unit 170 and the second modulation unit 180 generate different transmission candidate signals from each other according to the switching control bits $S_0$ and $S_1$.

Specifically, when it is assumed that the real part Alamouti-coded symbol pairs and the imaginary part Alamouti-coded symbol pairs are respectively mapped in a frequency reversal manner on the basis of the $(N/2-1)^{th}$ subcarrier, in the case in which the switching control bits $(S_0,S_1)$ are $(0,0)$, a transmission candidate signal $x_A^{(1)}(t)$ for the antenna A, which is generated by the first modulation unit 170, and a transmission candidate signal $x_B^{(1)}(t)$ for the antenna B, which is generated by the second modulation unit 180, are respectively given by the above-described Equations 19 and 20.

Further, when the switching control bits $(S_0,S_1)$ are $(0,1)$, a transmission candidate signal $x_A^{(2)}(t)$ for the antenna A, which is generated by the first modulation unit 170, and a transmission candidate signal $x_B^{(2)}(t)$ for the antenna B, which is generated by the second modulation unit 180, are respectively given by the above-described Equations 21 and 22.

Further, when the switching control bits $(S_0,S_1)$ are $(1,1)$, a transmission candidate signal $x_A^{(3)}(t)$ for the antenna A, which is generated by the first modulation unit 170, and a transmission candidate signal $x_B^{(3)}(t)$ for the antenna B, which is generated by the second modulation unit 180, are respectively given by the above-described Equations 23 and 24.

Further, when the switching control bits $(S_0,S_1)$ are $(0,1)$, a transmission candidate signal $x_A^{(4)}(t)$ for the antenna A, which is generated by the first modulation unit 170, and a transmission candidate signal $x_B^{(4)}(t)$ for the antenna B, which is generated by the second modulation unit 180, are respectively given by the above-described Equations 25 and 26.

As a result, when the real part Alamouti-coded symbol pairs and the imaginary part Alamouti-coded symbol pairs, which are generated according to the switching control bit $S_0$, are respectively mapped in a frequency reversal manner on the basis of the $(N/2-1)^{th}$ subcarrier, transmission candidate signal sets which are generated according to the switching control bits $S_0$ and $S_1$ are as follows.

| $(s_0, s_1)$ | Transmission Candidate Signal Sets $x_A^{(v)}(t), x_B^{(v)}(t)$ |
| --- | --- |
| (0, 0) | $x_A^{(1)}(t), x_B^{(1)}(t)$ |
| (1, 0) | $x_A^{(2)}(t), x_B^{(2)}(t)$ |
| (1, 1) | $x_A^{(3)}(t), x_B^{(3)}(t)$ |
| (0, 1) | $x_A^{(4)}(t), x_B^{(4)}(t)$ |

Figure 7:
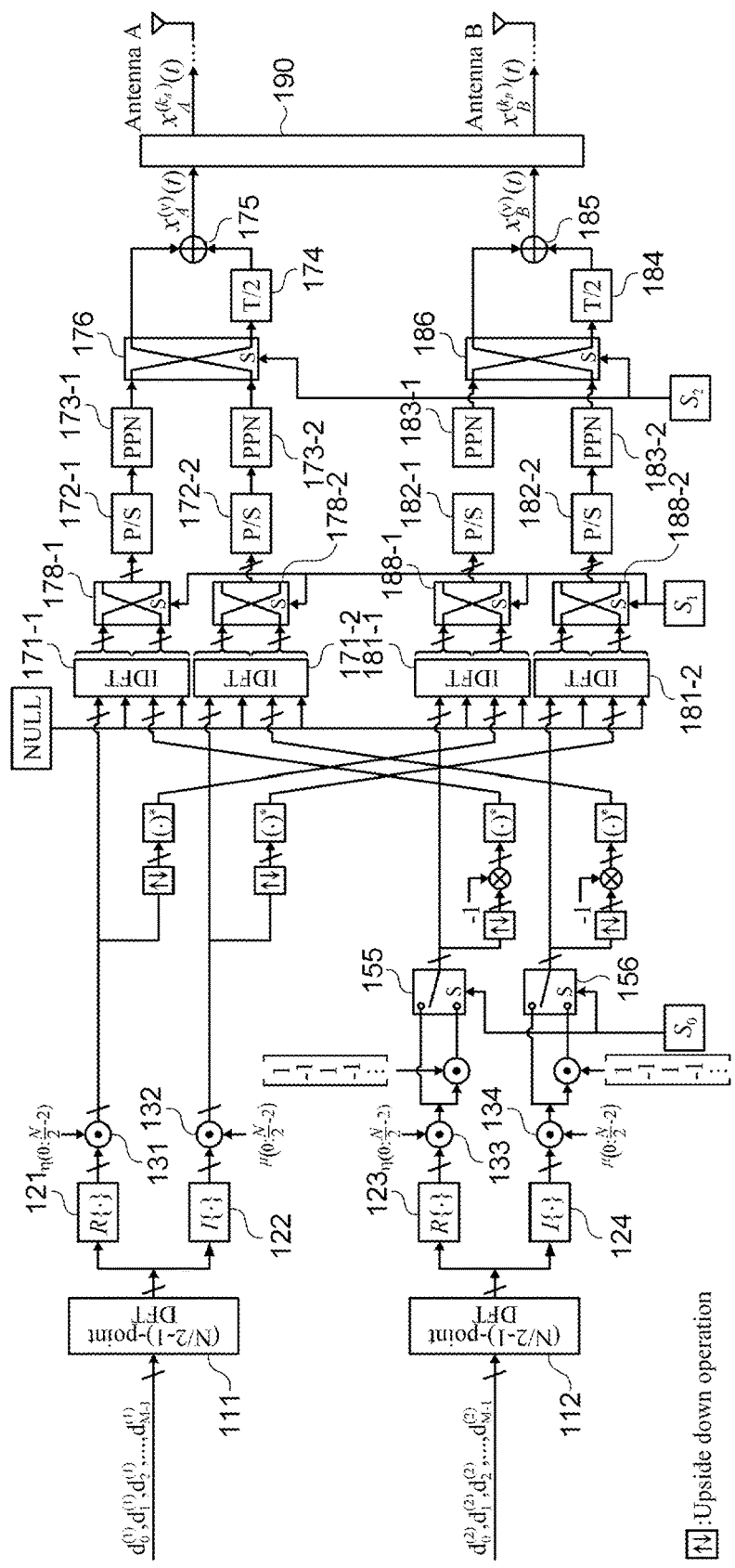
FIG. 7 is a detailed configuration diagram of a modulation apparatus according to a fifth embodiment of the present disclosure.

FIG. 7 is a detailed configuration diagram of a modulation apparatus according to a fifth embodiment of the present disclosure.

By comparing FIGS. 6 and 7, the embodiment shown in FIG. 7 has the same structure as the embodiment shown in FIG. 6 except that switches 176 and 186 for selecting an output to be time-shifted by T/2 from among outputs of the upper PPNs 173-1 and 183-1 and outputs of the lower PPNs 173-2 and 183-2 are respectively added to the first modulation unit 170 and the second modulation unit 180.

However, unlike in the embodiment shown in FIG. 6, in the embodiment shown in FIG. 7, a transmission candidate signal for each antenna may be additionally generated by a switching operation of each of the switches 176 and 186 added to the first modulation unit 170 and the second modulation unit 180.

Specifically, in the example shown in FIG. 7, the two switches 176 and 186 operate in synchronization with a switching control bit $S_2$. When the switching control bit $S_2$ is 0, the outputs of the lower PPNs 173-2 and 183-2 of the first modulation unit 170 and the second modulation unit 180 are time-shifted by T/2, and when the switching control bit $S_2$ is 1, the outputs of the upper PPNs 173-1 and 183-1 of the first modulation unit 170 and the second modulation unit 180 are time-shifted by T/2.

Therefore, in the embodiment shown in FIG. 7, different transmission candidate signals are generated according to the switching control bits $S_0$, $S_1$, and $S_2$.

Meanwhile, when the switching control bit $S_2$ is 0, the embodiment shown in FIG. 7 is the same as the embodiment shown in FIG. 6, and thus the same transmission candidate signals as those in the embodiment shown in FIG. 2 are generated according to the switching control bits $S_0$ and $S_1$. When the switching control bit $S_2$ is 1, transmission candidate signals different from those in the embodiment shown in FIG. 6 are generated according to the switching control bits $S_0$ and $S_1$.

Specifically when it is assumed that the real part Alamouti-coded symbol pairs and the imaginary part Alamouti-coded symbol pairs, which are generated by the encoding unit 160 according to the switching control bit $S_0$, are respectively mapped in a frequency reversal manner on the basis of the $(N/2-1)^{th}$ subcarrier, the case in which the switching control bits $(S_0,S_1,S_2)$ are (0,0,0) is the same as the case in which the switching control bits $(S_0,S_1)$ are (0,0) in the example shown in FIG. 6. Therefore, when the switching control bits $(S_0,S_1,S_2)$ are (0,0,0), a transmission candidate signal $x_A^{(1)}(t)$ for the antenna A, which is generated by the first modulation unit 170, and a transmission candidate signal $x_B^{(1)}(t)$ for the antenna B, which is generated by the second modulation unit 180, are respectively given by the above-described Equations 19 and 20.

Further, the case in which the switching control bits $(S_0,S_1,S_2)$ are (1,0,0) is the same as the case in which the switching control bits $(S_0,S_1)$ are (1,0) in the example shown in FIG. 6. Therefore, when the switching control bits $(S_0,S_1,S_2)$ are (1,0,0), a transmission candidate signal $x_A^{(2)}(t)$ for the antenna A, which is generated by the first modulation unit 170, and a transmission candidate signal $x_B^{(2)}(t)$ for the antenna B, which is generated by the second modulation unit 180, are respectively given by the above-described Equations 21 and 22.

Further, the case in which the switching control bits $(S_0,S_1,S_2)$ are (1,1,0) is the same as the case in which the switching control bits $(S_0,S_1)$ are (1,1) in the example shown in FIG. 6. Therefore, when the switching control bits $(S_0,S_1,S_2)$ are (1,1,0), a transmission candidate signal $x_B^{(3)}(t)$ for the antenna A, which is generated by the first modulation unit 170, and a transmission candidate signal $x_B^{(3)}(t)$ for the antenna B, which is generated by the second modulation unit 180, are respectively given by the above-described Equations 23 and 24.

Further, the case in which the switching control bits $(S_0,S_1,S_2)$ are (0,1,0) is the same as the case in which the switching control bits $(S_0,S_1)$ are (0,1) in the example shown in FIG. 6. Therefore, when the switching control bits $(S_0,S_1,S_2)$ are (0,1,0), a transmission candidate signal $x_A^{(4)}(t)$ for the antenna A, which is generated by the first modulation unit 170, and a transmission candidate signal $x_B^{(4)}(t)$ for the antenna B, which is generated by the second modulation unit 180, are respectively given by the above-described Equations 25 and 26.

Meanwhile, when the switching control bits $(S_0,S_1,S_2)$ are (0,0,1), a transmission candidate signal $x_A^{(5)}(t)$ for the antenna A, which is generated by the first modulation unit 170, and a transmission candidate signal $x_B^{(5)}(t)$ for the antenna B, which is generated by the second modulation unit 180, are respectively given by the above-described Equations 27 and 28.

Further, when the switching control bits $(S_0,S_1,S_2)$ are (1,0,1), a transmission candidate signal $x_A^{(6)}(t)$ for the antenna A, which is generated by the first modulation unit 170, and a transmission candidate signal $x_B^{(6)}(t)$ for the antenna B, which is generated by the second modulation unit 180, are respectively given by the above-described Equations 29 and 30.

Further, when the switching control bits $(S_0,S_1,S_2)$ are (1,1,1), a transmission candidate signal $x_A^{(7)}(t)$ for the antenna A, which is generated by the first modulation unit 170, and a transmission candidate signal $x_B^{(7)}(t)$ for the antenna B, which is generated by the second modulation unit 180, are respectively given by the above-described Equations 31 and 32.

Further, when the switching control bits $(S_0,S_1,S_2)$ are (0,1,1), a transmission candidate signal $x_A^{(8)}(t)$ for the antenna A, which is generated by the first modulation unit 170, and a transmission candidate signal $x_B^{(8)}(t)$ for the antenna B, which is generated by the second modulation unit 180, are respectively given by the above-described Equations 33 and 34.

As a result, when the real part Alamouti-coded symbol pairs and the imaginary part Alamouti-coded symbol pairs, which are generated according to the switching control bit $S_0$ are respectively mapped in a frequency reversal manner on the basis of the $(N/2-1)^{th}$ subcarrier, the transmission candidate signal sets which are generated according to the switching control bits $S_0$, $S_1$, and $S_2$ are as follows.

| $(s_0, s_1, s_2)$ | Transmission Candidate Signal Sets $x_A^{(v)}(t), x_B^{(v)}(t)$ |
|---|---|
| (0, 0, 0) | $x_A^{(1)}(t), x_B^{(1)}(t)$ |
| (1, 0, 0) | $x_A^{(2)}(t), x_B^{(2)}(t)$ |
| (1, 1, 0) | $x_A^{(3)}(t), x_B^{(3)}(t)$ |
| (0, 1, 0) | $x_A^{(4)}(t), x_B^{(4)}(t)$ |
| (0, 0, 1) | $x_A^{(5)}(t), x_B^{(5)}(t)$ |
| (1, 0, 1) | $x_A^{(6)}(t), x_B^{(6)}(t)$ |
| (1 1, 1) | $x_A^{(7)}(t), x_B^{(7)}(t)$ |
| (0, 1, 1) | $x_A^{(8)}(t), x_B^{(8)}(t)$ |

Meanwhile, the selection unit 190 selects a transmission candidate signal set having the lowest peak power or the lowest PAPR from among eight transmission candidate signal sets generated according to the switching control bits $S_0$, $S_1$, and $S_2$ as a transmission signal for each antenna.

According to the embodiments of the present disclosure, in a multiple antenna transmission method, after a plurality of transmission candidate signals, which are modulated for each antenna using a DFT-spread FBMC and OQAM technique and are capable of obtaining a single carrier effect, are generated, a transmission candidate signal with a low PAPR can be selected and transmitted, and thus PAPR performance can be effectively improved, and interference between subcarriers can be eliminated by applying an Alamouti coding manner.

Meanwhile, the embodiment of the present disclosure may include a computer readable recording medium including a program for executing methods described in this specification in a computer. The computer readable recording medium may include a program instruction, a local data file, a local data structure, and/or combinations thereof. The medium may be specially designed and prepared for the present disclosure or may be generally used in a computer software field. Examples of the computer readable recording medium include magnetic media such as a hard disk, a floppy disk, and a magnetic tape, optical media such as a compact disc read only memory (CD-ROM) and a digital video disc (DVD), magneto-optical media such as a floptical disk, and a hard device such as a read only memory (ROM), a random access memory (RAM), or a flash memory that is specially made to store and perform program instructions. Examples of the program instruction may include a machine code generated by a compiler and a high-level language code that can be executed in a computer using an interpreter.

While the present disclosure has been described above in detail with reference to representative embodiments, it may be understood by those skilled in the art that the embodiment may be variously modified without departing from the scope of the present disclosure. Therefore, the scope of the present disclosure is defined not by the described embodiment but by the appended claims, and encompasses equivalents that fall within the scope of the appended claims.

What is claimed is:

1. A modulation method comprising:
   generating a first DFT(Discrete Fourier Transform)-spread symbol group and a second DFT-spread symbol group by performing DFT on each of a first quadrature amplitude modulation (QAM) data symbol group and a second QAM data symbol group;
   extracting a real part symbol and an imaginary part symbol from each of DFT-spread symbols included in each of the first DFT-spread symbol group and the second DFT-spread symbol group;
   generating a first real part symbol group and a second real part symbol group by multiplying real part symbols extracted from the first DFT-spread symbol group and the second DFT-spread symbol group by a first phase shift coefficient;
   generating a first imaginary part symbol group and a second imaginary part symbol group by multiplying imaginary part symbols extracted from the first DFT-spread symbol group and the second DFT-spread symbol group by a second phase shift coefficient;
   generating a plurality of different transmission candidate signal sets each including a transmission candidate signal for a first antenna and a transmission candidate signal for a second antenna which are modulated in a filter bank multi-carrier and offset quadrature amplitude modulation (FBMC/OQAM) manner using the first real part symbol group, the second real part symbol group, the first imaginary part symbol group and the second imaginary part symbol group; and
   selecting a transmission candidate signal set having a lowest peak power or a lowest peak-to-average power ratio from among the plurality of different transmission candidate sets as a transmission signal for each of the first antenna and the second antenna.

2. The modulation method of claim 1, wherein the first phase shift coefficient satisfies the following equation, Equation 1, $$\eta_k = j^k \quad \text{[Equation 1]}$$

(where $\eta_k$ denotes the first phase shift coefficient multiplied by a $k^{th}$ real part symbol), and
the second phase shift coefficient satisfies the following equation, Equation 2, $$\mu_k = j(-j)^k \quad \text{[Equation 2]}$$

(where $\mu_k$ denotes the second phase shift coefficient multiplied by a $k^{th}$ imaginary part symbol).

3. The modulation method of claim 1, wherein the generating of the plurality of different transmission candidate signal sets comprises:
   generating real part Alamouti-coded symbol pairs and imaginary part Alamouti-coded symbol pairs for each of the first antenna and the second antenna the first real part symbol group, the second real part symbol group, the first imaginary part symbol group and the second imaginary part symbol group;
   mapping the real part Alamouti-coded symbol pairs and the imaginary part Alamouti-coded symbol pairs for each of the first antenna and the second antenna to subcarriers for each of the first antenna and the second antenna in a frequency reversal manner; and
   generating the transmission candidate signal for the first antenna by modulating the real part Alamouti-coded symbol pairs and the imaginary part Alamouti-coded symbol pairs for the first antenna, which are mapped to the subcarriers for the first antenna in the FBMC/OQAM manner, and generating the transmission candidate signal for the second antenna by modulating the real part Alamouti-coded symbol pairs and the imaginary part Alamouti-coded symbol pairs for the second antenna, which are mapped to the subcarriers for the second antenna in the FBMC/OQAM manner.

4. The modulation method of claim 3, wherein the generating of the real part Alamouti-coded symbol pairs and the imaginary part Alamouti-coded symbol pairs comprises:
   generating a third real part symbol group in which signs of symbols whose index is an odd number among symbols included in the first real part symbol group are inverted, and a fourth real part symbol group in which signs of symbols whose index is an odd number among symbols included in the second real part symbol group are inverted;
   generating a third imaginary part symbol group in which signs of symbols whose index is an odd number among symbols included in the first imaginary part symbol group are inverted, and a fourth imaginary part symbol group in which signs of symbols whose index is an odd number among symbols included in the second imaginary part symbol group are inverted;
   outputting the first real part symbol group and the first imaginary part symbol group or the third real part symbol group and the third imaginary part symbol group according to a first switching control bit;

outputting the second real part symbol group and the second imaginary part symbol group or the fourth real part symbol group and the fourth imaginary part symbol group according to a second switching control bit; and generating the real part Alamouti-coded symbol pairs and the imaginary part Alamouti-coded symbol pairs for each of the first antenna and the second antenna by encoding the real part symbol groups and imaginary part symbol groups, which are output according to the first switching control bit and the second switching control bit, to Alamouti code.

5. The modulation method of claim 4, wherein the generating of the transmission candidate signal comprises:

generating a real part modulated signal by performing inverse DFT (IDFT) and filtering using a poly-phase network on the real part Alamouti-coded symbol pairs mapped to the subcarriers;

generating an imaginary part modulated signal by performing IDFT and filtering using a poly-phase network on the imaginary part Alamouti-coded symbol pairs mapped to the subcarriers; and adding the real part modulated signal and the imaginary part modulated signal after time-shifting one of the real part modulated signal and the imaginary part modulated signal by T/2 (where T denotes a length of a symbol interval).

6. The modulation method of claim 5, wherein the adding of the real part modulated signal and the imaginary part modulated signal comprises: adding the real part modulated signal and the imaginary part modulated signal after time-shifting one of the real part modulated signal and the imaginary part modulated signal by T/2 according to a third switching control bit.

7. The modulation method of claim 6, wherein the generating of the plurality of different transmission candidate signal sets further comprises: generating the plurality of different transmission candidate signal sets according to the first switching control bit, the second switching control bit and the third switching control bit.

8. The modulation method of claim 7, wherein:

a QAM data symbol included in each of the first QAM data symbol group and the second QAM data symbol group is a QAM data symbol of an $l^{th}$ data block among a plurality of consecutive data blocks which are obtained by dividing one data frame (where l is a real number satisfying 0≤l≤L−1 and L denotes a number of divided data blocks); and the transmission candidate signal for the first antenna and the transmission candidate signal for the second antenna are transmission candidate signals for the $l^{th}$ data block.

9. The modulation method of claim 8, wherein the generating of the plurality of different transmission candidate signal sets further comprises: multiplying the transmission candidate signal set by an imaginary number j according to the third switching control bit.

10. The modulation method of claim 3, the generating of the real part Alamouti-coded symbol pairs and the imaginary part Alamouti-coded symbol pairs comprises:

generating a fourth real part symbol group in which signs of symbols whose index is an odd number among symbols included in the second real part symbol group, and a fourth imaginary part symbol group in which signs of symbols whose index is an odd number among symbols included in the second imaginary part symbol group are inverted;

outputting the second real part symbol group and the second imaginary part symbol group or the fourth real part symbol group and the fourth imaginary part symbol group, according to a first switching control bit;

generating the real part Alamouti-coded symbol pairs for each of the first antenna and the second antenna by encoding the first real part symbol group and a real part symbol group, which is output according to the first switching control bit, to Alamouti code; and generating the imaginary part Alamouti-coded symbol pairs for each of the first antenna and the second antenna by encoding the first imaginary part symbol group and an imaginary part symbol group, which is output according to the first switching control bit, to Alamouti code.

11. The modulation method of claim 10, wherein the generating of the transmission candidate signal comprises:

generating a real part modulated signal by performing inverse DFT (IDFT) and filtering using a poly-phase network on the real part Alamouti-coded symbol pairs mapped to the subcarriers;

generating an imaginary part modulated signal by performing IDFT and filtering using a poly-phase network on the imaginary part Alamouti-coded symbol pairs mapped to the subcarriers; and adding the real part modulated signal and the imaginary part modulated signal after time-shifting one of the real part modulated signal and the imaginary part modulated signal by T/2 (where T denotes a length of a symbol interval).

12. The modulation method of claim 11, wherein generating of the real part modulated signal and the imaginary part modulated signal, performs the filtering after switching $0^{th}$ to $(N/2−1)^{th}$ outputs and $(N/2)^{th}$ to $(N−1)^{th}$ outputs among an output vector of the IDFT according to a second switching control bit (where N denotes a number of the subcarriers).

13. The modulation method of claim 12, wherein the adding of the real part modulated signal and the imaginary part modulated signal comprise: adding the real part modulated signal and the imaginary part modulated signal after time-shifting one of the real part modulated signal and the imaginary part modulated signal by T/2 according to a third switching control bit.

14. The modulation method of claim 13, wherein the generating of the plurality of different transmission candidate signal sets further comprises: generating the plurality of different transmission candidate signal sets according to the first switching control bit, the second switching control bit, and the third switching control bit.

15. The modulation method of claim 14, wherein:

a QAM data symbol included in each of the first QAM data symbol group and the second QAM data symbol group is a QAM data symbol of an $l^{th}$ data block among a plurality of consecutive data blocks which are obtained by dividing one data frame (where l is a real number satisfying 0≤l≤L−1 and L denotes a number of divided data blocks); and the transmission candidate signal for the first antenna and the transmission candidate signal for the second antenna are transmission candidate signals for the $l^{th}$ data block.

16. The modulation method of claim 15, wherein the generating of the plurality of different transmission candidate signal sets further comprises: multiplying the transmission candidate signal set by an imaginary number j according to the third switching control bit.

\* \* \* \* \*